(12) United States Patent
Shao et al.

(10) Patent No.: US 10,820,313 B2
(45) Date of Patent: Oct. 27, 2020

(54) METHOD FOR SENDING CONTROL INFORMATION, APPARATUS, AND SYSTEM

(71) Applicant: Huawei Technologies Co., Ltd., Shenzhen (CN)

(72) Inventors: Jiafeng Shao, Beijing (CN); Chaojun Li, Beijing (CN); Sha Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/270,677

(22) Filed: Feb. 8, 2019

(65) Prior Publication Data
US 2019/0246384 A1 Aug. 8, 2019

Related U.S. Application Data

(63) Continuation of application No. PCT/CN2016/095067, filed on Aug. 12, 2016.

(51) Int. Cl.
*H04W 72/04* (2009.01)
*H04L 5/00* (2006.01)

(52) U.S. Cl.
CPC ......... *H04W 72/044* (2013.01); *H04L 5/0048* (2013.01); *H04L 5/0057* (2013.01); *H04L 5/0082* (2013.01); *H04L 5/0091* (2013.01); *H04W 72/042* (2013.01); *H04L 5/0005* (2013.01)

(58) Field of Classification Search
None
See application file for complete search history.

(56) References Cited

U.S. PATENT DOCUMENTS

| | | | | |
|---|---|---|---|---|
| 2014/0161088 A1* | 6/2014 | Seo | ........... | H04W 72/1278 370/329 |
| 2014/0169312 A1* | 6/2014 | Wang | ........... | H04W 48/12 370/329 |

(Continued)

FOREIGN PATENT DOCUMENTS

| | | |
|---|---|---|
| CN | 102447538 A | 5/2012 |
| CN | 104618081 A | 5/2015 |

OTHER PUBLICATIONS

"Details of Two-stage downlink control channel," 3GPP TSG-RAN WG1 Meeting #85, Nanjing, China, R1-164487, 3rd Generation Partnership Project, Valbonne, France (May 23-27, 2016).

(Continued)

*Primary Examiner* — Anh Vu H Ly
(74) *Attorney, Agent, or Firm* — Leydig, Voit & Mayer, Ltd.

(57) ABSTRACT

A method for sending control information includes: determining, by a network device based on a first time-frequency domain resource for sending first control information, at least one information field included in the first control information; determining, by the network device, a quantity of bits of the first control information based on the at least one information field; and sending, by the network device, the first control information to a user terminal on the first time-frequency domain resource based on the quantity of bits of the first control information. The present application can improve data transmission efficiency.

12 Claims, 6 Drawing Sheets

A network device determines, based on a first time-frequency domain resource for sending first control information, at least one information field included in the first control information — 401

The network device determines a quantity of bits of the first control information based on the at least one information field — 402

The network device sends the first control information to a user terminal on the first time-frequency domain resource based on the quantity of bits of the first control information — 403

(56) References Cited

U.S. PATENT DOCUMENTS

| | | | | |
|---|---|---|---|---|
| 2014/0198737 | A1* | 7/2014 | Papasakellariou | H04L 5/0055 370/329 |
| 2015/0124783 | A1 | 5/2015 | Li | |
| 2015/0319777 | A1* | 11/2015 | Seo | H04L 1/1822 370/330 |
| 2016/0044638 | A1* | 2/2016 | Gao | H04W 72/042 370/280 |
| 2016/0242151 | A1* | 8/2016 | Seo | H04W 76/10 |
| 2017/0290046 | A1* | 10/2017 | Sun | H04W 74/006 |
| 2017/0367046 | A1* | 12/2017 | Papasakellariou | H04W 72/042 |
| 2018/0227885 | A1* | 8/2018 | Lee | H04L 5/001 |
| 2019/0387501 | A1* | 12/2019 | Park | H04W 72/1273 |

OTHER PUBLICATIONS

"DCI design for short TTI," 3GPP TSG RAN WG1 Meeting #84bis, Busan, Korea, R1-162588, 3rd Generation Partnership Project, Valbonne, France (Apr. 11-15, 2016).

"3rd Generation Partnership Project; Technical Specification Group Radio Access Network; Evolved Universal Terrestrial Radio Access (E-UTRA); Physical channels and modulation(Release 13)," 3GPP TS 36.211 V13.2.0, pp. 1-168, 3rd Generation Partnership Project, Valbonne, France (Jun. 2016).

"3rd Generation Partnership Project; Technical Specification Group Radio Access Network; Evolved Universal Terrestrial Radio Access (E-UTRA); Multiplexing and channel coding(Release 13)," 3GPP TS 36.212 V13.2.0, pp. 1-140, 3rd Generation Partnership Project, Valbonne, France (Jun. 2016).

"3rd Generation Partnership Project; Technical Specification Group Radio Access Network; Evolved Universal Terrestrial Radio Access (E-UTRA); Physical layer procedures(Release 13)," 3GPP TS 36.213 V13.2.0, pp. 1-381, 3rd Generation Partnership Project, Valbonne, France (Jun. 2016).

"Downlink control singaling design for shorten TTI," 3GPP TSG. RAN WGI #85, R1-164160, Nanjing, China, XP051096558, pp. 1-6, 3rd Generation Partnership Project—Valbonne, France (May 14, 2016).

"On two-level DL control channel design for shorter TTI operation," 3GPP TSG-RAN WG1 Meeting #85, R1-165237, Nanjing, China, XP051090186, pp. 1-6, 3rd Generation Partnership Project— Valbonne, France ( May 13, 2016).

"DL channel design for shortened TTI," 3GPP TSG-RAN WG1 Meeting #85, R1-164458, Nanjing, China, XP051096436, pp. 1-8, 3rd Generation Partnership Project—Valbonne, France (May 14, 2016).

"On DL control channel design for shorter TTI operation," 3GPP TSG-RAN WG1 Meeting #85, R1-165236, Nanjing, China, XP051090187, pp. 1-4, 3rd Generation Partnership Project— Valbonne, France (May 13, 2016).

"DCI design for short TTI," 3GPP TSG-RAN WG1 #85, Nanjing, China, R1-164060, pp. 1-16, 3rd Generation Partnership Project, Valbonne, France (May 23-27, 2016).

"Discussions on DL control channel design for short TTI," 3GPP TSG-RAN WG1 #84b, Busan, Korea, R1-162545, pp. 1-5, 3rd Generation Partnership Project, Valbonne, France (Apr. 11-15, 2016).

"Overview on frame structure and downlink design for TTI shortening," 3GPP TSG-RAN WG1 #84, Malta, R1-161011, 3rd Generation Partnership Project, Valbonne, France (Feb. 15-19, 2016).

* cited by examiner

METHOD FOR SENDING CONTROL INFORMATION, APPARATUS, AND SYSTEM

CROSS-REFERENCE TO RELATED APPLICATIONS

This application is a continuation of International Application No. PCT/CN2016/095067, filed on Aug. 12, 2016, the disclosure of which is hereby incorporated by reference in its entirety.

TECHNICAL FIELD

The present application relates to the field of communications technologies, and in particular, to a method for sending control information, an apparatus, and a system.

BACKGROUND

With development of communications technologies, the Long Term Evolution (LTE) system is applied more widely. In the LTE system, data on various physical channels may be transmitted based on a TTI (transmission time interval) of 1 ms. A short-TTI data transmission mechanism is further set in the LTE system to reduce a data transmission delay and improve data transmission efficiency. Duration of a short TTI is shorter than one subframe or 1 ms, for example, may be 0.5 ms or 0.25 ms.

In the LTE system, when a network device sends information to UE (User Equipment) in A TTIs or instructs UE to send information in A TTIs, the network device sends control information in the A TTIs, where A is a positive integer greater than or equal to 1. For example, the control information may be DCI (downlink control information). The control information may include a plurality of pieces of sub information such as CSI (channel state information) indication information and SRS (sounding reference signal) request information.

A piece of sub information such as SRS request information may always exist in the control information. However, after a TTI is shortened, the control information may appear more frequently. In this case, some sub information in the control information may be redundant. The redundant sub information increases overheads of system resources occupied by the control information, reducing data transmission efficiency.

SUMMARY

To resolve the problem in the prior art, embodiments of the present application provide a method for sending control information, an apparatus, and a system. The technical solutions are as follows.

According to a first aspect, a method for sending control information is provided. In the method, a network device determines, based on a first time-frequency domain resource for sending first control information, at least one information field included in the first control information; the network device determines a quantity of bits of the first control information based on the at least one information field; and then the network device sends the first control information to a user terminal on the first time-frequency domain resource based on the quantity of bits of the first control information.

A total quantity of bits sent by the network device to the user terminal may be greater than or equal to the quantity of bits of the first control information.

In a possible design, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

The information carried in the first information field includes format differentiation indication information or TTI duration indication information. The at least two control information formats may include a control information format indicating a TTI of 1 ms and a format of a TTI shorter than 1 ms; or the at least two control information formats may include a first control information format and a second control information format. The at least two time lengths may include duration of 1 ms and duration shorter than 1 ms. Herein the duration may indicate that the user terminal is to receive information or send information in the duration.

When the first time-frequency domain resource is not in the first time region, for example, when the first time-frequency domain resource is a time-frequency domain resource in a transmission time period that is shorter than or equal to 0.5 ms, the information field of the first control information may not include the information carried in the first information field.

In another possible design, when the first time-frequency domain resource is a time-frequency domain resource beyond a first time region, the at least one information field includes a second information field, information carried in the second information field is used to indicate a time-frequency domain resource not occupied by a downlink control channel, or used to indicate a time-frequency domain resource occupied by a downlink control channel, or used to indicate a time-frequency domain resource occupied by a downlink data channel, and the first time region is a time region to which first one, two, three, or four symbols in a downlink subframe belong, or is a physical downlink control channel PDCCH region.

The information carried in the second information field is information indicating resource usage of the downlink data channel. The time-frequency domain resource occupied by the downlink control channel may include a CCE (control channel element) occupied by the downlink control channel for carrying DCI in a transmission time period, or a resource block RB occupied by the downlink control channel in a transmission time period, or a resource element RE occupied by the downlink control channel in a transmission time period. The time-frequency domain resource not occupied by the downlink control channel may include a CCE not occupied by the downlink control channel for carrying DCI in a transmission time period, or a resource block RB not occupied by the downlink control channel in a transmission time period, or a resource element RE not occupied by the downlink control channel in a transmission time period. The time-frequency domain resource occupied by the downlink data channel may include a resource block RB occupied by the downlink data channel in a transmission time period, or a resource element RE occupied by the downlink data channel in a transmission time period. A transmission time period may be a 2-symbol transmission time period, a transmission time period that is shorter than or equal to 0.5 ms, or a transmission time period that is 1 ms.

That the first time-frequency domain resource is a time-frequency domain resource beyond a first time region includes: The first time-frequency domain resource is a time-frequency domain resource in a transmission time period that is shorter than or equal to 0.5 ms. When the first time-frequency domain resource is in the first time region, the information field of the first control information may not include the information carried in the second information field.

In another possible design, when the first time-frequency domain resource is a time-frequency domain resource in a second time region, the at least one information field includes a third information field, information carried in the third information field is used to trigger the user terminal to send a sounding reference signal SRS, and the second time region is configured by the network device or predefined.

The information carried in the third information field includes SRS request information.

After determining that the information field of the first control information may include the third information field, the network device may set a status of a bit of the third information field according to whether the user terminal is triggered to send the sounding reference signal SRS. When the first time-frequency domain resource is not in the second time region, the information field of the first control information may not include the information carried in the third information field.

In another possible design, when the first time-frequency domain resource is a time-frequency domain resource in a third time region, the at least one information field includes a fourth information field, information carried in the fourth information field is used to trigger the user terminal to send channel quality information CSI, and the third time region is configured by the network device or predefined.

The information carried in the fourth information field includes channel state information CSI indication information.

After determining that the information field of the first control information may include the fourth information field, the network device may set a status of a bit of the fourth information field according to whether the user terminal is triggered to send the channel quality information CSI. When the first time-frequency domain resource is not in the third time region, the information field of the first control information may not include the information carried in the fourth information field.

The third time region is a fixed or predefined time region, such as a PDCCH region. This is not limited in this embodiment.

Alternatively, the third time region may be determined based on a previous time of receiving CSI indication information of the user terminal by the network device.

In another possible design, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

According to a second aspect, a method for sending control information is provided. In the method, a network device determines at least one information field included in first control information, where information carried in the at least one information field includes at least one or any combination of the following:

redundancy version information corresponding to information received and/or sent in at least one transmission time period;

N, where N indicates N transmission time periods, the first control information is used to instruct a user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and the network device sends the first control information to the user terminal.

The network device may use a solution in the prior art to determine the information field included in the first control information, or may use the solution provided in the present application to determine the information field included in the first control information.

In a possible design, the at least one information field includes a first information field, and information carried in the first information field includes the redundancy version information corresponding to the information received and/or sent in the at least one transmission time period; and before the network device sends the first control information to the user terminal, the method further includes:

the network device determines M, where the at least one transmission time period is M transmission time periods, and M is a positive integer greater than or equal to 1; and the network device determines a status of at least one bit of the first information field based on M, a quantity of bits of the first information field, and the redundancy version information corresponding to the information received and/or sent in the M transmission time periods.

M may be determined by the network device based on the first control information or other control information, or may be determined based on higher layer signaling sent by the network device to the user terminal, or may be allocated by the network device to the user equipment based on a traffic volume of the user equipment, or may be determined by the network device by itself. The quantity of bits of the first information field is a quantity of bits of the information included in the first information field or a quantity of bits included in the first information field.

The network device may prestore a correspondence between a quantity of transmission time periods, the quantity of bits of the first information field, the status of the bit of the first information field, and the redundancy version information corresponding to the information received and/or sent in the at least one transmission time period. The network device may determine the status of the at least one bit of the first information field based on the correspondence, M, the quantity of bits of the first information field, and the redundancy version information corresponding to the information received and/or sent in the M transmission time periods. The M transmission time periods may be continuous or discontinuous.

The correspondence may be specifically as follows: when the quantity of bits of the first information field is X, where a value of X may be configured based on higher layer signaling, fixed, or predefined, the network device may determine, based on a relationship between values of X and M, a quantity of bits indicating a redundancy version, and further determine the status of the at least one bit of the first information field based on the redundancy version information corresponding to the information received and/or sent in the M transmission time periods. Three cases are included as follows:

(1) When M is greater than X, one bit in X is used to indicate a type of the redundancy version, and one state of the at least one bit is corresponding to one redundancy version in at least two transmission time periods.

(2) When M is less than X and M is greater than a first preset threshold, one state of each bit in X is corresponding to a redundancy version in a maximum of one TTI. The first preset threshold is a positive integer, and may be obtained by rounding down X/2 or X/3. This is not limited in this embodiment.

(3) When M is less than or equal to a first preset threshold, one state of every i bits is corresponding to a redundancy version in a maximum of one TTI. The first preset threshold is a positive integer, and may be obtained by rounding down X/i, where i is a positive integer greater than or equal to 1.

In another possible design, the at least one information field includes a second information field, and information carried in the second information field includes N; and before the network device sends the first control information to the user terminal, the method further includes:

the network device determines a status of at least one bit of the second information field based on N and a first correspondence, where the first correspondence is a correspondence between the status of the at least one bit and N, and the first correspondence is configured by the network device or predefined.

A quantity of bits of the second information field may be fixed or predefined. Correspondingly, a quantity of elements in a quantity set of transmission time periods that may be indicated by the second information field is determined by the quantity of bits of the second information field. For example, if the quantity of bits is n, a maximum quantity of elements in the quantity set is $2^n$. A value represented by each element in the quantity set may be configured by the user terminal based on higher layer signaling or predefined.

Alternatively, a quantity of bits of the second information field is variable. The network device may determine the quantity of bits of the second information field based on duration of a scheduled transmission time period, and then determine the status of the at least one bit of the second information field based on N and the first correspondence.

In another possible design, the at least one information field includes a third information field, and information carried in the third information field includes the information indicating whether the uplink data is to be transmitted on the uplink channel in the at least one transmission time period; and before the network device sends the first control information to the user terminal, the method further includes:

the network device determines P, where P indicates that the user terminal is to receive information in P transmission time periods and/or indicates that the user terminal is to send information in the P transmission time periods, and P is a positive integer greater than or equal to 1;

when P is greater than 1, the network device determines that the third information field is an information field of K bits, and that the third information field is used to indicate whether the uplink data is to be transmitted on the uplink channel in K transmission time periods in the P transmission time periods, where K is a positive integer greater than or equal to 1 and less than or equal to P, that is, the third information field may be used to indicate that the uplink data is to be transmitted on the uplink channel in a part of the K transmission time periods, and that no uplink data is to be transmitted on the uplink channel in other parts of the K transmission time periods; and/or when P is equal to 1, the network device determines that the third information field is a modulation and coding scheme MCS information field, and that the third information field is used to indicate whether the uplink data is to be transmitted on the uplink channel in one transmission time period, where a state 29 of a bit of the MCS information field may be used to indicate that no uplink data is to be transmitted on the uplink channel in the transmission time period.

The network device compares P with 1.

In another possible design, one or more of the at least one transmission time period are duration shorter than or equal to 0.5 ms.

In addition, this embodiment further provides a method for sending control information. A processing procedure for the method may be as follows: A network device sends first control information, where the first control information includes an indication of scheduling information of a user terminal in at least one transmission time period having first duration, the scheduling information is used to trigger the user terminal to receive information in the transmission time period and/or indicate that the user terminal is to send information in P transmission time periods, and the first duration is duration shorter than or equal to 0.5 ms; and the network device sends second control information, where the second control information is used to indicate whether uplink data is to be transmitted on an uplink channel in one of the at least one transmission time period.

In the method, after sending the first control information, the network device may separately send a piece of control information (that is, the second control information) to indicate whether the user terminal is to transmit the uplink data on the uplink channel in one of the at least one transmission time period.

According to a third aspect, a method for detecting control information is provided. In the method, a user terminal determines, based on a first time-frequency domain resource for detecting first control information, at least one information field included in the first control information; the user terminal determines a quantity of bits of the first control information based on the at least one information field, and then detects the first control information on the first time-frequency domain resource based on the quantity of bits of the first control information; and the user terminal receives the first control information after detecting the first control information.

A total quantity of bits sent by a network device to the user terminal may be greater than or equal to the quantity of bits of the first control information.

In a possible design, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

The information carried in the first information field includes format differentiation indication information or TTI duration indication information. The at least two control information formats may include a control information format indicating a TTI of 1 ms and a format indicating a TTI shorter than 1 ms; or the at least two control information formats may include a first control information format and a second control information format. The at least two time lengths may include duration of 1 ms and duration shorter than 1 ms. Herein the duration may indicate that the user terminal is to receive information or send information in the duration.

When the first time-frequency domain resource is not in the first time region, for example, when the first time-frequency domain resource is a time-frequency domain resource in a transmission time period that is shorter than or equal to 0.5 ms, the information field of the first control information may not include the information carried in the first information field.

In another possible design, when the first time-frequency domain resource is a time-frequency domain resource beyond a first time region, the at least one information field includes a second information field, information carried in the second information field is used to indicate a time-frequency domain resource not occupied by a downlink control channel, or used to indicate a time-frequency domain resource occupied by a downlink control channel, or used to indicate a time-frequency domain resource occupied by a downlink data channel, and the first time region is a time region to which first one, two, three, or four symbols in a downlink subframe belong, or is a physical downlink control channel PDCCH region.

The information carried in the second information field is information indicating resource usage of the downlink data channel. The time-frequency domain resource occupied by the downlink control channel may include a CCE occupied by the downlink control channel for carrying DCI in a transmission time period, or a resource block RB occupied by the downlink control channel in a transmission time period, or a resource element RE occupied by the downlink control channel in a transmission time period. The time-frequency domain resource not occupied by the downlink control channel may include a CCE not occupied by the downlink control channel for carrying DCI in a transmission time period, or a resource block RB not occupied by the downlink control channel in a transmission time period, or a resource element RE not occupied by the downlink control channel in a transmission time period. The time-frequency domain resource occupied by the downlink data channel may include a resource block RB occupied by the downlink data channel in a transmission time period, or a resource element RE occupied by the downlink data channel in a transmission time period.

That the first time-frequency domain resource is a time-frequency domain resource beyond a first time region includes: The first time-frequency domain resource is a time-frequency domain resource in a transmission time period that is shorter than or equal to 0.5 ms. When the first time-frequency domain resource is in the first time region, the information field of the first control information may not include the information carried in the second information field.

In another possible design, when the first time-frequency domain resource is a time-frequency domain resource in a second time region, the at least one information field includes a third information field, information carried in the third information field is used to trigger the user terminal to send a sounding reference signal SRS, and the second time region is determined by the user terminal based on received higher layer signaling or predefined.

The information carried in the third information field includes SRS request information.

After the user terminal determines that the information field of the first control information may include the information carried in the third information field, the user terminal may determine, based on a status of a bit of the third information field, whether to send the sounding reference signal SRS. When the first time-frequency domain resource is not in the second time region, the user terminal may determine that the first control information does not include the information carried in the third information field.

In another possible design, when the first time-frequency domain resource is a time-frequency domain resource in a third time region, the at least one information field includes a fourth information field, information carried in the fourth information field is used to trigger the user terminal to send channel quality information CSI, and the third time region is determined by the user terminal based on received higher layer signaling or predefined.

The information carried in the fourth information field includes periodic channel state information CSI indication information.

After the user terminal determines that the information field of the first control information may include the fourth information field, the user terminal may determine, based on a status of a bit of the fourth information field, whether to send the channel quality information CSI. When the first time-frequency domain resource is not in the third time region, the user terminal may determine that the first control information does not include the information carried in the fourth information field. Specifically, the information field of the first control information may not include the fourth information field, or the information field of the first control information includes the fourth information field but the fourth information field does not carry the information used to trigger the user terminal to send the channel quality information CSI, or the information field of the first control information includes the fourth information field but the user terminal does not receive the information that is carried in the fourth information field and that is used to trigger the user terminal to send the channel quality information CSI. A quantity of bits of the fourth information field may be determined by the user terminal or predefined.

The third time region is a fixed or predefined time region, such as a PDCCH region. This is not limited in this embodiment.

Alternatively, the third time region is determined based on a previous time of receiving CSI indication information of the user terminal by the network device.

In another possible design, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

According to a fourth aspect, a method for detecting control information is provided. In the method, a user terminal receives first control information, where the first control information includes at least one information field, and information carried in the at least one information field includes at least one or any combination of the following:

redundancy version information corresponding to information received and/or sent in at least one transmission time period;

N, where N indicates N transmission time periods, the first control information is used to instruct the user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and the user terminal obtains the information carried in the at least one information field.

The user terminal may use a solution in the prior art to determine the information field included in the first control information, or may use the solution provided in the present application to determine the information field included in the first control information.

In a possible design, information carried in a first information field in the at least one information field includes the redundancy version information corresponding to the information received and/or sent in the at least one transmission time period; and that the user terminal obtains the information carried in the at least one information field includes:

the user terminal determines a status of at least one bit of the first information field;

the user terminal determines M, where the at least one transmission time period is M transmission time periods, and M is a positive integer greater than or equal to 1; and the user terminal determines, based on a quantity of bits of the first information field, the status of the at least one bit of the first information field, and M, the redundancy version information corresponding to the information received and/or sent in the M transmission time periods.

M indicates that the user terminal is to receive information in the M transmission time periods and/or is used to trigger the user terminal to send information in the M transmission time periods. M may be determined by the user terminal based on the first control information or other control information, or may be determined based on higher layer signaling sent by a network device to the user terminal, or may be allocated by a network device to the user terminal based on a traffic volume of the user terminal. The M transmission time periods may be continuous or discontinuous. This is not limited in this embodiment.

The user terminal may prestore a correspondence between a quantity of transmission time periods, the quantity of bits of the first information field, the status of the bit of the first information field, and the redundancy version information corresponding to the information received and/or sent in the at least one transmission time period. The user terminal may determine, based on the correspondence, M, the quantity of bits of the first information field, and the status of the at least bit, the redundancy version information corresponding to the information received and/or sent in the M transmission time periods.

The correspondence may be specifically as follows: When the quantity of bits of the first information field is X, where a value of X may be configured based on higher layer signaling, fixed, or predefined, the user terminal may determine, based on a relationship between values of X and M, a quantity of bits indicating a redundancy version, and further determine the status of the at least one bit of the first information field based on the redundancy version information corresponding to the information received and/or sent in the M transmission time periods. Three cases are included as follows:

(1) When M is greater than X, one bit in X is used to indicate information about the redundancy version, and one state of the at least one bit is corresponding to one redundancy version in at least two transmission time periods.

(2) When M is less than X and M is greater than a first preset threshold, one state of each bit in X is corresponding to a redundancy version in a maximum of one TTI. The first preset threshold is a positive integer, and may be obtained by rounding down X/2 or X/3. This is not limited in this embodiment.

(3) When M is less than or equal to a first preset threshold, one state of every i bits is corresponding to a redundancy version in a maximum of one TTI. The first preset threshold is a positive integer, and may be obtained by rounding down X/i, where i is a positive integer greater than or equal to 1.

In another possible design, information carried in a second information field in the at least one information field includes N; and that the user terminal obtains the information carried in the at least one information field includes:

the user terminal determines a status of at least one bit of the second information field; and the user terminal determines N based on a first correspondence and the status of the at least one bit of the second information field, where the first correspondence is a correspondence between the status of the at least one bit and N, and the first correspondence is determined by the user terminal based on received higher layer signaling or predefined.

A quantity of bits of the second information field may be fixed or predefined. Correspondingly, a quantity of elements in a quantity set of transmission time periods that may be indicated by the second information field is determined by the quantity of bits of the second information field. For example, if the quantity of bits is n, a maximum quantity of elements in the quantity set is $2^n$. A value represented by each element in the quantity set may be configured by the user terminal based on higher layer signaling or predefined.

Alternatively, a quantity of bits of the second information field is variable. The user terminal may determine the quantity of bits of the second information field based on duration of a scheduled transmission time period, and then determine the status of the at least one bit of the second information field based on N and the first correspondence.

In another possible design, information carried in a third information field in the at least one information field includes the information indicating whether the uplink data is to be transmitted on the uplink channel in the at least one transmission time period; and that the user terminal obtains the information carried in the at least one information field includes:

the user terminal determines P, where P indicates that the user terminal is to receive information in P transmission time periods and/or indicates that the user terminal is to send information in the P transmission time periods, and P is a positive integer greater than or equal to 1;

when P is greater than 1, the user terminal determines that the third information field is an information field of K bits, and that the information carried in the third information field indicates whether the uplink data is to be transmitted on the uplink channel in K transmission time periods in the P transmission time periods, that is, the third information field may be used to indicate that the uplink data is to be transmitted on the uplink channel in a part of the K transmission time periods, and that no uplink data is to be transmitted on the uplink channel in other parts of the K transmission time periods; and/or when P is equal to 1, the user terminal determines that the third information field is a modulation and coding scheme MCS information field, and that the information carried in the third information field indicates whether the uplink data is to be transmitted on the uplink channel in the P transmission time periods, where a state 29 of a bit of the MCS information field may be used to indicate that no uplink data is to be transmitted on the uplink channel in the transmission time period.

The user terminal compares P with 1, where P may be the same as N, or may be different from N.

In another possible design, one or more of the at least one transmission time period are duration shorter than or equal to 0.5 ms.

According to a fifth aspect, a method for detecting control information is provided. In the method, a user terminal receives first control information, where the first control information is used to indicate a time-frequency resource occupied by an uplink channel in at least one transmission time period; the user terminal determines a time-frequency resource that needs to be occupied by uplink control information on the uplink channel, and/or determines a time-frequency resource that needs to be occupied by uplink data to be transmitted in the at least one transmission time period; the user terminal determines ratio information, where the ratio information is a ratio of the time-frequency resource that needs to be occupied by the uplink control information on the uplink channel to the time-frequency resource occupied by the uplink channel, or a ratio of the time-frequency resource that needs to be occupied by the uplink data to be transmitted in the at least one transmission time period to the time-frequency resource occupied by the uplink channel, or a ratio of the time-frequency resource that needs to be occupied by the uplink control information on the uplink channel to the time-frequency resource that needs to be occupied by the uplink data to be transmitted in the at least one transmission time period; and the user terminal determines, based on the ratio information, whether to transmit the uplink data on the uplink channel.

The time-frequency resource that needs to be occupied by the uplink control information may be a quantity of bits of the uplink control information, or duration corresponding to the uplink control information. The time-frequency resource that needs to be occupied by the uplink data to be transmitted in the at least one transmission time period may be a quantity of bits of the uplink data, or duration corresponding to the uplink data. The time-frequency resource that needs to be occupied by the uplink control information may alternatively be determined based on the quantity of bits of the uplink control information and a modulation and coding scheme of the uplink control information. The time-frequency resource that needs to be occupied by the uplink data may alternatively be determined based on the quantity of bits of the uplink data and a modulation and coding scheme of the uplink data.

When the ratio is the ratio of the time-frequency resource that needs to be occupied by the uplink control information on the uplink channel to the time-frequency resource occupied by the uplink channel, or the ratio of the time-frequency resource that needs to be occupied by the uplink control information on the uplink channel to the time-frequency resource that needs to be occupied by the uplink data to be transmitted in the at least one transmission time period, if the ratio information is greater than a second preset threshold, it may be determined that no uplink data is to be transmitted on the uplink channel; or if the ratio information is less than or equal to a second preset threshold, it may be determined that the uplink data is to be transmitted on the uplink channel. When the ratio is the ratio of the time-frequency resource that needs to be occupied by the uplink data to be transmitted in the at least one transmission time period to the time-frequency resource occupied by the uplink channel, if the ratio information is less than the second preset threshold, it may be determined that no uplink data is to be transmitted on the uplink channel; or if the ratio information is greater than or equal to the second preset threshold, it may be determined that the uplink data is to be transmitted on the uplink channel. The second preset threshold may be notified by a network device by using signaling or predefined.

According to a sixth aspect, a network device is provided, where the network device includes:

a determining module, configured to determine, based on a first time-frequency domain resource for sending first control information, at least one information field included in the first control information; where the determining module is further configured to determine a quantity of bits of the first control information based on the at least one information field; and a sending module, configured to send the first control information to a user terminal on the first time-frequency domain resource based on the quantity of bits of the first control information.

In a possible design, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

In another possible design, when the first time-frequency domain resource is a time-frequency domain resource beyond a first time region, the at least one information field includes a second information field, information carried in the second information field is used to indicate a time-frequency domain resource not occupied by a downlink control channel, or used to indicate a time-frequency domain resource occupied by a downlink control channel, or used to indicate a time-frequency domain resource occupied by a downlink data channel, and the first time region is a time region to which first one, two, three, or four symbols in a downlink subframe belong, or is a physical downlink control channel PDCCH region.

In another possible design, when the first time-frequency domain resource is a time-frequency domain resource in a second time region, the at least one information field includes a third information field, information carried in the third information field is used to trigger the user terminal to send a sounding reference signal SRS, and the second time region is predefined or configured.

In another possible design, when the first time-frequency domain resource is a time-frequency domain resource in a third time region, the at least one information field includes a fourth information field, information carried in the fourth information field is used to trigger the user terminal to send channel quality information CSI, and the third time region is predefined or configured.

In another possible design, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

According to a seventh aspect, a network device is provided, where the network device includes:

a determining module, configured to determine at least one information field included in first control information, where information carried in the at least one information field includes at least one or any combination of the following:

redundancy version information corresponding to information received and/or sent in at least one transmission time period;

N, where N indicates N transmission time periods, the first control information is used to instruct a user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and a sending module, configured to send the first control information to the user terminal.

In a possible design, the at least one information field includes a first information field, and information carried in the first information field includes the redundancy version information corresponding to the information received and/or sent in the at least one transmission time period; and the determining module is further configured to:

determine M, where the at least one transmission time period is M transmission time periods, and M is a positive integer greater than or equal to 1; and determine a status of at least one bit of the first information field based on M, a quantity of bits of the first information field, and the redundancy version information corresponding to the information received and/or sent in the M transmission time periods.

In another possible design, the at least one information field includes a second information field, and information carried in the second information field includes N; and the determining module is further configured to:

determine a status of at least one bit of the second information field based on N and a first correspondence, where the first correspondence is a correspondence between the status of the at least one bit and N, and the first correspondence is configured by the network device or predefined.

In another possible design, the at least one information field includes a third information field, and information carried in the third information field includes the information indicating whether the uplink data is to be transmitted on the uplink channel in the at least one transmission time period; and the determining module is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the third information field is used to indicate whether the uplink data is to be transmitted on the uplink channel in K transmission time periods in the P transmission time periods, where K is a positive integer greater than or equal to 1 and less than or equal to P; and/or when P is equal to 1, determine that the third information field is a modulation and coding scheme MCS information field, and that the third information field is used to indicate whether the uplink data is to be transmitted on the uplink channel in one transmission time period.

In another possible design, one or more of the at least one transmission time period are duration shorter than or equal to 0.5 ms.

According to an eighth aspect, a user terminal is provided, where the user terminal includes:

a determining module, configured to determine, based on a first time-frequency domain resource for detecting first control information, at least one information field included in the first control information; where the determining module is further configured to determine a quantity of bits of the first control information based on the at least one information field;

a detection module, configured to detect the first control information on the first time-frequency domain resource based on the quantity of bits of the first control information; and a receiving module, configured to receive the first control information after the detection module detects the first control information.

In a possible design, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

In another possible design, when the first time-frequency domain resource is a time-frequency domain resource beyond a first time region, the at least one information field includes a second information field, information carried in the second information field is used to indicate a time-frequency domain resource not occupied by a downlink control channel, or used to indicate a time-frequency domain resource occupied by a downlink control channel, or used to indicate a time-frequency domain resource occupied by a downlink data channel, and the first time region is a time region to which first one, two, three, or four symbols in a downlink subframe belong, or is a physical downlink control channel PDCCH region.

In another possible design, when the first time-frequency domain resource is a time-frequency domain resource in a second time region, the at least one information field includes a third information field, information carried in the third information field is used to trigger the user terminal to send a sounding reference signal SRS, and the second time region is determined by the user terminal based on received higher layer signaling or predefined.

In another possible design, when the first time-frequency domain resource is a time-frequency domain resource in a third time region, the at least one information field includes a fourth information field, information carried in the fourth information field is used to trigger the user terminal to send channel quality information CSI, and the third time region is determined by the user terminal based on received higher layer signaling or predefined.

In another possible design, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

According to a ninth aspect, a user terminal is provided, where the user terminal includes:

a receiving module, configured to receive first control information, where the first control information includes at least one information field, and information carried in the at least one information field includes at least one or any combination of the following:

redundancy version information corresponding to information received and/or sent in at least one transmission time period;

N, where N indicates N transmission time periods, the first control information is used to instruct the user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and an obtaining module, configured to obtain the information carried in the at least one information field.

In a possible design, information carried in a first information field in the at least one information field includes the redundancy version information corresponding to the information received and/or sent in the at least one transmission time period; and the obtaining module is further configured to:

determine a status of at least one bit of the first information field;

determine M, where the at least one transmission time period is M transmission time periods, and M is a positive integer greater than or equal to 1; and determine, based on a quantity of bits of the first information field, the status of the at least one bit of the first information field, and M, the redundancy version information corresponding to the information received and/or sent in the M transmission time periods.

In another possible design, information carried in a second information field in the at least one information field includes N; and the obtaining module is further configured to:

determine a status of at least one bit of the second information field; and determine N based on a first correspondence and the status of the at least one bit of the second information field, where the first correspondence is a correspondence between the status of the at least one bit and N, and the first correspondence is determined by the user terminal based on received higher layer signaling or predefined.

In another possible design, information carried in a third information field in the at least one information field includes the information indicating whether the uplink data is to be transmitted on the uplink channel in the at least one transmission time period; and the obtaining module is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the information carried in the third information field indicates whether the uplink data is to be transmitted on the uplink channel in K transmission time periods in the P transmission time periods; and/or when P is equal to 1, determine that the third information field is a modulation and coding scheme MCS information field, and that the information carried in the third information field indicates whether the uplink data is to be transmitted on the uplink channel in the P transmission time periods.

In another possible design, one or more of the at least one transmission time period are duration shorter than or equal to 0.5 ms.

According to a tenth aspect, a user terminal is provided, where the user terminal includes:

a receiving module, configured to receive first control information, where the first control information is used to indicate a time-frequency resource occupied by an uplink channel in at least one transmission time period; and a determining module, configured to determine a time-frequency resource that needs to be occupied by uplink control information on the uplink channel, and/or determine a time-frequency resource that needs to be occupied by uplink data to be transmitted in the at least one transmission time period; where the determining module is further configured to determine ratio information, where the ratio information is a ratio of the time-frequency resource that needs to be occupied by the uplink control information on the uplink channel to the time-frequency resource occupied by the uplink channel, or a ratio of the time-frequency resource that needs to be occupied by the uplink data to be transmitted in the at least one transmission time period to the time-frequency resource occupied by the uplink channel, or a ratio of the time-frequency resource that needs to be occupied by the uplink control information on the uplink channel to the time-frequency resource that needs to be occupied by the uplink data to be transmitted in the at least one transmission time period; and the determining module is further configured to determine, based on the ratio information, whether to transmit the uplink data on the uplink channel.

According to an eleventh aspect, a network device is provided, where the network device includes:

a processor, configured to determine, based on a first time-frequency domain resource for sending first control information, at least one information field included in the first control information; where the processor is further configured to determine a quantity of bits of the first control information based on the at least one information field; and a transceiver, configured to send the first control information to a user terminal on the first time-frequency domain resource based on the quantity of bits of the first control information.

In a possible design, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

In another possible design, when the first time-frequency domain resource is a time-frequency domain resource beyond a first time region, the at least one information field includes a second information field, information carried in the second information field is used to indicate a time-frequency domain resource not occupied by a downlink control channel, or used to indicate a time-frequency domain resource occupied by a downlink control channel, or used to indicate a time-frequency domain resource occupied by a downlink data channel, and the first time region is a time region to which first one, two, three, or four symbols in a downlink subframe belong, or is a physical downlink control channel PDCCH region.

In another possible design, when the first time-frequency domain resource is a time-frequency domain resource in a second time region, the at least one information field includes a third information field, information carried in the third information field is used to trigger the user terminal to send a sounding reference signal SRS, and the second time region is predefined or configured.

In another possible design, when the first time-frequency domain resource is a time-frequency domain resource in a third time region, the at least one information field includes a fourth information field, information carried in the fourth information field is used to trigger the user terminal to send channel quality information CSI, and the third time region is predefined or configured.

In another possible design, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

According to a twelfth aspect, a network device is provided, where the network device includes:

a processor, configured to determine at least one information field included in first control information, where information carried in the at least one information field includes at least one or any combination of the following:

redundancy version information corresponding to information received and/or sent in at least one transmission time period;

N, where N indicates N transmission time periods, the first control information is used to instruct a user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and a transceiver, configured to send the first control information to the user terminal.

In a possible design, the at least one information field includes a first information field, and information carried in the first information field includes the redundancy version information corresponding to the information received and/or sent in the at least one transmission time period; and the processor is further configured to:

determine M, where the at least one transmission time period is M transmission time periods, and M is a positive integer greater than or equal to 1; and determine a status of at least one bit of the first information field based on M, a quantity of bits of the first information field, and the redundancy version information corresponding to the information received and/or sent in the M transmission time periods.

In another possible design, the at least one information field includes a second information field, and information carried in the second information field includes N; and the processor is further configured to:

determine a status of at least one bit of the second information field based on N and a first correspondence, where the first correspondence is a correspondence between the status of the at least one bit and N, and the first correspondence is configured by the network device or predefined.

In another possible design, the at least one information field includes a third information field, and information carried in the third information field includes the information indicating whether the uplink data is to be transmitted on the uplink channel in the at least one transmission time period; and the processor is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the third information field is used to indicate whether the uplink data is to be transmitted on the uplink channel in K transmission time periods in the P transmission time periods, where K is a positive integer greater than or equal to 1 and less than or equal to P; and/or when P is equal to 1, determine that the third information field is a modulation and coding scheme MCS information field, and that the third information field is used to indicate whether the uplink data is to be transmitted on the uplink channel in one transmission time period.

In another possible design, one or more of the at least one transmission time period are duration shorter than or equal to 0.5 ms.

According to a thirteenth aspect, a user terminal is provided, where the user terminal includes:

a processor, configured to determine, based on a first time-frequency domain resource for detecting first control information, at least one information field included in the first control information; where the processor is further configured to determine a quantity of bits of the first control information based on the at least one information field; and the processor is further configured to detect the first control information on the first time-frequency domain resource based on the quantity of bits of the first control information; and a transceiver, configured to receive the first control information after the processor detects the first control information.

In a possible design, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

In another possible design, when the first time-frequency domain resource is a time-frequency domain resource beyond a first time region, the at least one information field includes a second information field, information carried in the second information field is used to indicate a time-frequency domain resource not occupied by a downlink control channel, or used to indicate a time-frequency domain resource occupied by a downlink control channel, or used to indicate a time-frequency domain resource occupied by a downlink data channel, and the first time region is a time region to which first one, two, three, or four symbols in a downlink subframe belong, or is a physical downlink control channel PDCCH region.

In another possible design, when the first time-frequency domain resource is a time-frequency domain resource in a second time region, the at least one information field includes a third information field, information carried in the third information field is used to trigger the user terminal to send a sounding reference signal SRS, and the second time region is determined by the user terminal based on received higher layer signaling or predefined.

In another possible design, when the first time-frequency domain resource is a time-frequency domain resource in a third time region, the at least one information field includes a fourth information field, information carried in the fourth information field is used to trigger the user terminal to send channel quality information CSI, and the third time region is determined by the user terminal based on received higher layer signaling or predefined.

In another possible design, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

According to a fourteenth aspect, a user terminal is provided, where the user terminal includes:

a processor, configured to receive first control information, where the first control information includes at least one information field, and information carried in the at least one information field includes at least one or any combination of the following:

redundancy version information corresponding to information received and/or sent in at least one transmission time period;

N, where N indicates N transmission time periods, the first control information is used to instruct the user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; where the processor is further configured to obtain the information carried in the at least one information field.

In a possible design, information carried in a first information field in the at least one information field includes the redundancy version information corresponding to the information received and/or sent in the at least one transmission time period; and the processor is further configured to:

determine a status of at least one bit of the first information field;

determine M, where the at least one transmission time period is M transmission time periods, and M is a positive integer greater than or equal to 1; and determine, based on a quantity of bits of the first information field, the status of the at least one bit of the first information field, and M, the redundancy version information corresponding to the information received and/or sent in the M transmission time periods.

In another possible design, information carried in a second information field in the at least one information field includes N; and the processor is further configured to:

determine a status of at least one bit of the second information field; and determine N based on a first correspondence and the status of the at least one bit of the second information field, where the first correspondence is a correspondence between the status of the at least one bit and N, and the first correspondence is determined by the user terminal based on received higher layer signaling or predefined.

In another possible design, information carried in a third information field in the at least one information field includes the information indicating whether the uplink data is to be transmitted on the uplink channel in the at least one transmission time period; and the processor is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the information carried in the third information field indicates whether the uplink data is to be transmitted on the uplink channel in K transmission time periods in the P transmission time periods; and/or when P is equal to 1, determine that the third information field is a modulation and coding scheme MCS information field, and that the information carried in the third information field indicates whether the uplink data is to be transmitted on the uplink channel in the P transmission time periods.

In another possible design, one or more of the at least one transmission time period are duration shorter than or equal to 0.5 ms.

According to a fifteenth aspect, a user terminal is provided, where the user terminal includes:

a transceiver, configured to receive first control information, where the first control information is used to indicate a time-frequency resource occupied by an uplink channel in at least one transmission time period; and a processor, configured to determine a time-frequency resource that needs to be occupied by uplink control information on the uplink channel, and/or determine a time-frequency resource that needs to be occupied by uplink data to be transmitted in the at least one transmission time period; where the processor is further configured to determine ratio information, where the ratio information is a ratio of the time-frequency resource that needs to be occupied by the uplink control information on the uplink channel to the time-frequency resource occupied by the uplink channel, or a ratio of the time-frequency resource that needs to be occupied by the uplink data to be transmitted in the at least one transmission time period to the time-frequency resource occupied by the uplink channel, or a ratio of the time-frequency resource that needs to be occupied by the uplink control information on the uplink channel to the time-frequency resource that needs to be occupied by the uplink data to be transmitted in the at least one transmission time period; and the processor is further configured to determine, based on the ratio information, whether to transmit the uplink data on the uplink channel.

Beneficial effects of the technical solutions provided in the embodiments of the present application are as follows:

In the embodiments of the present application, the network device determines, based on the first time-frequency domain resource for sending the first control information, the at least one information field included in the first control information, determines the quantity of bits of the first control information based on the at least one information field, and sends the first control information to the user terminal on the first time-frequency domain resource based on the quantity of bits of the first control information. Based on the foregoing processing, redundant information in the control information can be reduced, and data transmission efficiency can be improved.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DESCRIPTION OF EMBODIMENTS

To make the objectives, technical solutions, and advantages of the present application clearer, the following further describes the implementations of the present application in detail with reference to the accompanying drawings.

Figure 1:
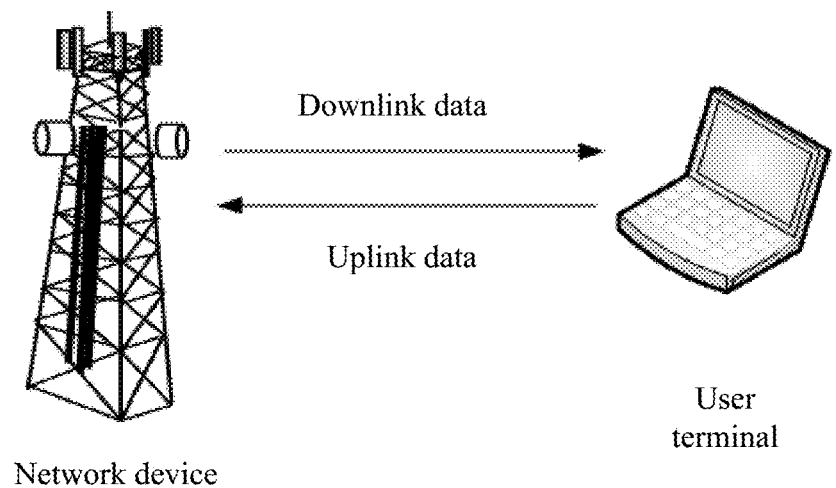
FIG. 1 is a system architectural diagram according to Embodiment 1 of the present application.

Actually, a network device and a user terminal may transmit data such as control information and service data by using the LTE system. Data sent by the network device to the user terminal may be referred to as downlink data, and data sent by the user terminal to the network device may be referred to as uplink data. The network device may be a base station, and the user terminal may be a mobile terminal or a PC (personal computer) terminal. FIG. 1 is a system architectural diagram according to an embodiment of the present application.

Figure 2:
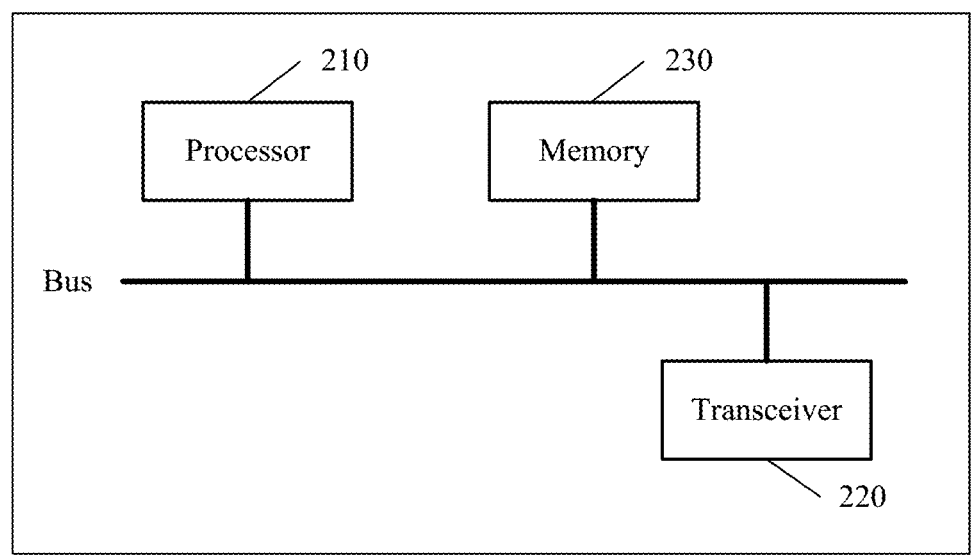
FIG. 2 is a schematic structural diagram of a network device or a user terminal according to an embodiment of the present application.

The network device in FIG. 1 may be implemented by using a computing device in FIG. 2. A schematic organizational structural diagram of the computing device is shown in FIG. 2. The computing device may include a processor 210, a transceiver 220, and a memory 230, where both the transceiver 220 and the memory 230 may be connected to the processor 210. The transceiver 220 may be configured to receive a message or data. The transceiver 220 may include but is not limited to an antenna, at least one amplifier, a tuner, one or more oscillators, a coupler, an LNA (low noise amplifier), a duplexer, or the like. The transceiver 220 may receive and send analog signals or digital signals, and may send the received digital signals to the processor 210, so that the processor 210 can process received data. The processor 210 may be a control center of the computing device, and connect each part of the computing device such as the transceiver 220 and the memory 230 by using various interfaces and lines. Optionally, the processor 210 may include one or more processing units. Preferably, the processor 210 may integrate an application processor and a modem processor. The application processor mainly processes an operating system. The modem processor mainly processes wireless communication. The processor 210 may alternatively be a digital signal processor, a dedicated integrated circuit, a field programmable gate array, another programmable logic device, or the like. The computing device may further include the memory 230. The memory 230 may include a volatile memory, for example, a random access memory (RAM). The memory may alternatively include a non-volatile memory, for example, a read-only memory (ROM), a flash memory, a hard disk drive (HDD), or a solid-state drive (SSD). The memory 230 may alternatively include a combination of the foregoing types of memories. When the technical solutions provided in this application are implemented by software, program code used to implement methods for sending control information provided in FIG. 4 and FIG. 5 in this application is stored in the memory 230, and executed by the processor 210 and the transceiver 220.

In addition, FIG. 2 may be a schematic structural diagram of a user terminal according to an embodiment of the present application. The user terminal may include a processor 210, a transceiver 220, and a memory 230. The memory 230 is configured to store computer-executable program code. The processor 210 is coupled to the memory 230 and the transceiver 220.

The program code includes an instruction. When the processor 210 executes the instruction, the instruction enables the user terminal to perform related steps in FIG. 6 to FIG. 8.

Figure 3:
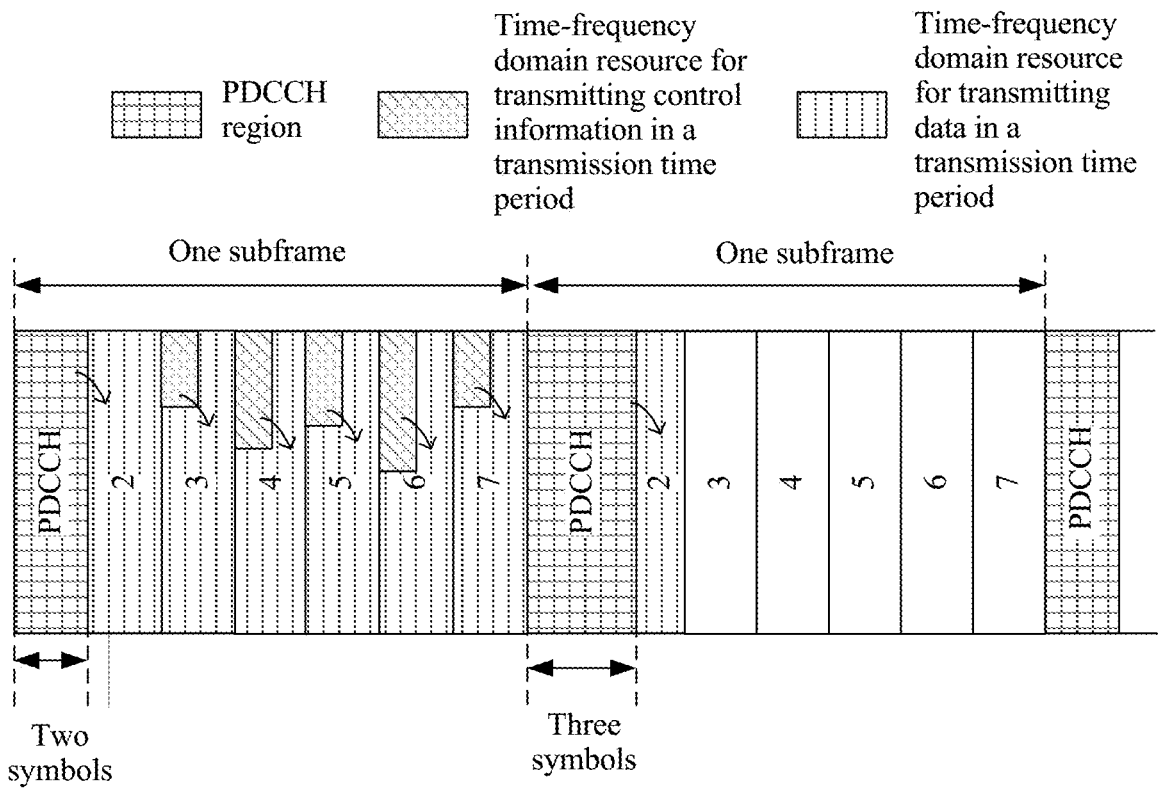
FIG. 3 is a schematic diagram of a physical channel according to an embodiment of the present application.

The LTE system usually uses a frame structure to transmit data. The frame structure may include three layers: radio frame, subframe, and symbol. A radio frame may include 10 subframes, duration of each subframe may be 1 millisecond (ms), each subframe may include two slots, and each slot may be 0.5 ms. Each slot may include a plurality of symbols. A quantity of symbols included in each slot is related to a length of a CP (cyclic prefix) in the subframe. For example, if the CP in the subframe is an NCP (normal CP) normal cyclic prefix, each slot includes seven symbols, and correspondingly each subframe includes 14 symbols. To be specific, each subframe includes symbols whose sequence numbers are #0, #1, #2, #3, #4, #5, #6, #0, #1, #2, #3, #4, #5, and #6 respectively. In a subframe, physical channels may be different, and the subframe includes 14 symbols, as shown in FIG. 3.

In this specification, "a plurality of" refers to at least two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Before the present application is described, technical terms used in the embodiments of the present application are first described briefly.

A downlink control channel may be replaced with at least one of the following: a short physical downlink control channel (sPDCCH), a physical downlink control channel (PDCCH), or another physical channel for transmitting downlink control information. The sPDCCH may be a time-frequency domain resource for transmitting control information in a transmission time period, and the transmission time period may be a transmission time period that is shorter than or equal to 0.5 ms.

A downlink data channel may be replaced with at least one of the following: a short physical downlink shared channel (sPDSCH), a physical downlink shared channel (PDSCH), or another physical channel for transmitting downlink data information. The sPDSCH may be a time-frequency domain resource for transmitting data in a transmission time period, and the transmission time period may be a transmission time period that is shorter than or equal to 0.5 ms.

A symbol means an OFDM symbol or an SC-FDMA symbol. The symbol is an orthogonal frequency division multiple access OFDMA symbol of the LTE system with a 15 kHz subcarrier spacing, a single carrier frequency division multiple access SC-FDMA symbol, or a symbol of a communications system with a larger subcarrier occupation frequency. This is not limited in this embodiment.

Duration of a transmission time period may indicate a time unit for information transmission, for example, a TTI (transmission time interval), a segment of time domain resources, a transmission time unit, or a time region. For example, the transmission time period may be a TTI, where duration of the TTI is 1 ms; or the transmission time period may be a short TTI, where duration of the short TTI is shorter than one subframe or 1 ms, for example, is 0.5 ms, 7-symbol duration, 6-symbol duration, 5-symbol duration, 4-symbol duration, 3-symbol duration, 2-symbol duration, or 1-symbol duration. In the LTE system, various physical channels may be transmitted in a transmission time period of specific duration. Further, a physical channel may be transmitted on all or some time-frequency domain resources in a transmission time period.

In each TTI, control information sent by a network device to UE (User Equipment) may be included. The control information may be DCI (downlink control information), and the control information may include at least one information field. Different information fields may include different control content, used to instruct the user terminal to perform different processing. For example, the control content may be control information format indication information or SRS (sounding reference signal) request information.

Figure 4:
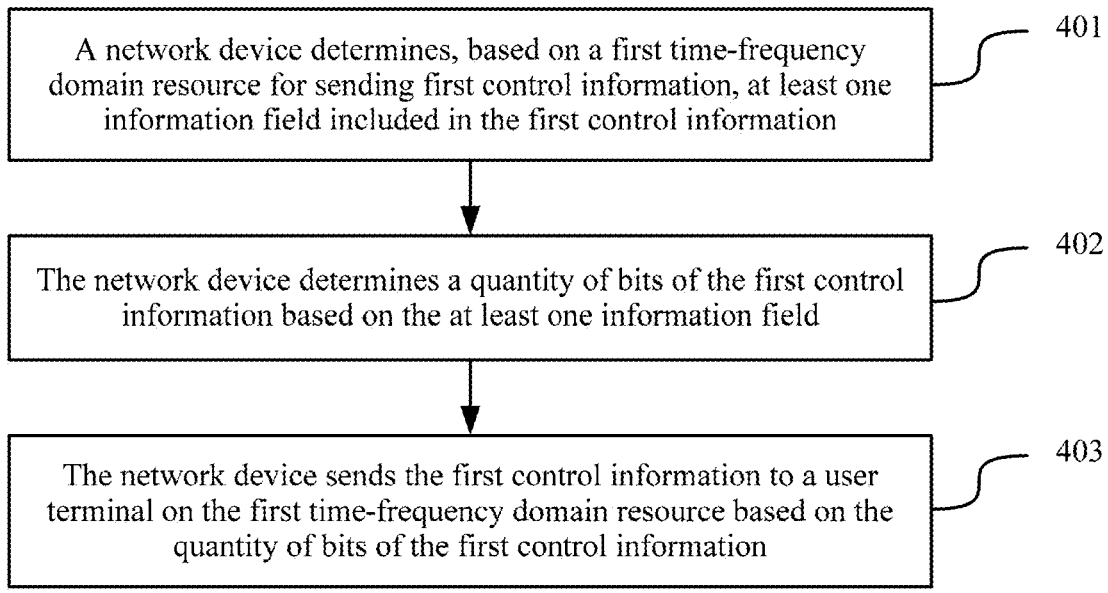
FIG. 4 is a flowchart of a method for sending control information according to an embodiment of the present application.

To minimize transmission resources (that is, time-frequency domain resources) occupied by control information in a TTI, and improve TTI transmission efficiency, this embodiment provides a method for sending control information, where the method may be performed by a network device. As shown in FIG. 4, a processing procedure for the method may be as follows.

Step 401: The network device determines, based on a first time-frequency domain resource for sending first control information, at least one information field included in the first control information.

The first time-frequency domain resource is a time-frequency domain resource for transmitting the first control information, and the first time-frequency domain resource includes at least one of the following three items: a time-frequency domain resource in a PDCCH region, a time-frequency domain resource in a time region to which first one, two, three, or four symbols in a downlink subframe belong, and a time-frequency domain resource in a transmission time period that is shorter than or equal to 0.5 ms. The first time-frequency domain resource may also be referred to as a first control region or a first downlink control channel region. For example, when the first time-frequency domain resource is a time-frequency domain resource in a time region to which first three symbols in a downlink subframe belong, and the downlink subframe is a subframe with an NCP, the first time-frequency domain resource includes symbols whose sequence numbers are #0, #1, and #2 in a first slot of the downlink subframe.

In an implementation, before sending the first control information to a user terminal, the network device may allocate one or more time-frequency domain resources (that is, a first time-frequency domain resource) for transmitting the first control information, and then may determine, based on the first time-frequency domain resource for sending the first control information, the at least one information field included in the first control information.

In this embodiment, when time-frequency domain resources for transmitting the first control information are different, information fields included in the first control information may be different or may be the same. In an implementation method, when the first time-frequency domain resource for sending the first control information is a time domain resource B, the first control information includes a first information field; or when the first time-frequency domain resource for sending the first control information is a time domain resource C, the first control information does not include a first information field. In another implementation method, when the first time-frequency domain resource for sending the first control information is a time domain resource B, the first control information includes a first information field, and the first information field is used to indicate first sub information; or when the first time-frequency domain resource for sending the first control information is a time domain resource C, the first control information includes a first information field, but the first information field is not used to indicate first sub information or is reserved and not used.

In this embodiment, there may be one or more pieces of first control information. If there are a plurality of pieces of first control information, correspondingly the method for sending control information according to the present application may be performed for each piece of control information.

Step 402: The network device determines a quantity of bits of the first control information based on the at least one information field.

In an implementation, the network device may calculate, based on a quantity of bits of each information field included in the first control information, a sum of quantities of bits of all information fields to obtain the quantity of bits of the first control information.

Step 403: The network device sends the first control information to a user terminal on the first time-frequency domain resource based on the quantity of bits of the first control information.

In an implementation, a total quantity of bits sent by the network device to the user terminal may be greater than or equal to the quantity of bits of the first control information. For example, a cyclic prefix check code CRC is added to the first control information to reduce a reception error probability, or the total quantity of bits is set to be the same as that of control information in another format to reduce a quantity of times of blind detection by the user terminal, (for example, 0 is added until the total quantity of bits is the same as that of the control information in the another format).

Optionally, in an implementation scenario of this embodiment, the network device may determine whether the first control information includes information carried in the first information field. A corresponding processing procedure may be as follows: When the first time-frequency domain resource is a time-frequency domain resource in a first time region, the at least one information field includes the first information field.

The information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

It should be noted that, the physical downlink control channel PDCCH region is in several start symbols of a subframe, a base station notifies all user terminals, served by a cell, of the PDCCH region by using a PCFICH channel, and the PDCCH region may vary in subframes. However, first one, two, three, or four symbols in a downlink subframe may be larger than, smaller than, or equal to a PDCCH region of the downlink subframe.

The information carried in the first information field includes format differentiation indication information or TTI duration indication information.

In an implementation, the at least two control information formats may include a control information format indicating a TTI of 1 ms, such as a DCI format 0, a DCI format 1, a DCI format 2, or a DCI format 4, and a format of a TTI shorter than 1 ms, such as a DCI format 7A or a DCI format 7B; or the at least two control information formats may include a first control information format and a second control information format, such as a DCI format 0 and a DCI format 7A. Numbers of the foregoing specific formats are not limited. The at least two time lengths may include duration of 1 ms and duration shorter than 1 ms. Herein the duration may indicate that the user terminal is to receive information or send information in the duration.

The network device may determine whether the first time-frequency domain resource is in the first time region. If the first time-frequency domain resource is in the first time region, the information field of the first control information may include the information carried in the first information field, and a status of a bit of the first information field is set based on the control information format or duration of the first control information. Specifically, the network device may add the first information field to the information field of the first control information, or may directly add the bit of the first information field to the first control information, and set the status of the bit of the first information field based on the control information format or duration of the first control information. If the first information field already exists in the information field of the first control information, or the bit of the first information field is already added, the network device may set the status of the bit of the first information field as valid, or may directly set the status of the bit of the first information field based on the control information format or duration of the first control information.

If the first time-frequency domain resource is not in the first time region, for example, if the first time-frequency domain resource is a time-frequency domain resource in a transmission time period that is shorter than or equal to 0.5 ms, the information field of the first control information may not include the information carried in the first information field. Specifically, the network device may not add the first information field to the information field of the first control information, that is, the quantity of bits of the first control information does not include the bit of the first information field. If the first information field already exists in the information field of the first control information, the network device may determine that the first information field is in a reserved state, remove the first information field from the first control information, or remove the bit of the first information field from the first control information, where the reserved state means that the bit of the first information field is still in the first control information, but the status of the bit of the first information field is no longer valid or no longer has a meaning of indication information. A quantity of bits of the first information field may be determined by the network device or predefined. It should be noted that, the first time-frequency domain resource may not exist in a transmission time period that is shorter than or equal to 0.5 ms, or the first time-frequency domain resource may be a part of time-frequency domain resources in a transmission time period that is shorter than or equal to 0.5 ms.

For example, if the time-frequency domain resource for sending the first control information is in the PDCCH region, the information field of the first control information includes the information carried in the first information field; or if the time-frequency domain resource for sending the first control information is in an sPDCCH region, the information field of the first control information does not include the information carried in the first information field, where the sPDCCH region may be a time region of downlink control information in a transmission time period that is shorter than or equal to 0.5 ms, or may be a transmission time period that is shorter than or equal to 0.5 ms. For example, the transmission time period is a 2-symbol TTI, and the sPDCCH region may be one symbol of the 2-symbol TTI or may be the 2-symbol TTI. For another example, if the time-frequency domain resource for sending the first control information is in the time region to which the first one, two, three, or four symbols in the downlink subframe belong, the information field of the first control information includes the information carried in the first information field; or if the time-frequency domain resource for sending the first control information is not in the time region to which the first one, two, three, or four symbols in the downlink subframe belong, the information field of the first control information does not include the information carried in the first information field.

Beneficial effects of this solution are as follows: In the PDCCH region, or in the time region to which the first one, two, three, or four symbols in the downlink subframe belong, the control information sent by the base station to the user terminal may be control information used to indicate a TTI of 1 ms, or may be control information used to indicate a short TTI that is shorter than 1 ms. Therefore, to reduce a quantity of times of blindly detecting the control information by the user terminal, the base station may set quantities of bits in the two types of control information to be the same, and use the first information field of the first control information to indicate specific control information to be used at this time. However, when the first time-frequency domain resource is in a time region other than the time region in the downlink subframe, the control information sent by the base station to the user terminal can only be control information used to indicate a short TTI that is shorter than 1 ms. Based on this, in this solution, the information carried in the first information field is sent only when the first time-frequency domain resource is in the first time region, and the information carried in the first information field is not sent in other cases. This can effectively reduce frequency of sending the information carried in the first information field, reduce redundant information in the control information, and improve data transmission efficiency.

Optionally, in another implementation scenario of this embodiment, the network device may determine whether the first control information includes information carried in a second information field. A corresponding processing procedure may be as follows: When the first time-frequency domain resource is a time-frequency domain resource beyond a first time region, the at least one information field includes the second information field.

The information carried in the second information field is used to indicate a time-frequency domain resource not occupied by a downlink control channel or used to indicate a time-frequency domain resource occupied by a downlink control channel or used to indicate a time-frequency domain resource occupied by a downlink data channel. The first time region is a time region to which first one, two, three, or four symbols in a downlink subframe belong, or is a physical downlink control channel PDCCH region.

The information carried in the second information field is information indicating resource usage of the downlink data channel.

In an implementation, the information carried in the second information field may include the time-frequency domain resource not occupied by the downlink control channel or is used to indicate the time-frequency domain resource occupied by the downlink control channel or is used to indicate the time-frequency domain resource occupied by the downlink data channel. The time-frequency domain resource occupied by the downlink control channel may include a CCE occupied by the downlink control channel for carrying DCI in a transmission time period, or a resource block RB occupied by the downlink control channel in a transmission time period, or a resource element RE occupied by the downlink control channel in a transmission time period. The time-frequency domain resource not occupied by the downlink control channel may include a CCE not occupied by the downlink control channel for carrying DCI in a transmission time period, or a resource block RB not occupied by the downlink control channel in a transmission time period, or a resource element RE not occupied by the downlink control channel in a transmission time period. The time-frequency domain resource occupied by the downlink data channel may include a resource block RB occupied by the downlink data channel in a transmission time period, or a resource element RE occupied by the downlink data channel in a transmission time period. It should be noted that, in this embodiment, a transmission time period may be a 2-symbol transmission time period, a transmission time period that is shorter than or equal to 0.5 ms, or a transmission time period that is 1 ms.

The network device may determine whether the first time-frequency domain resource is a time-frequency domain resource in the first time region. If the first time-frequency domain resource is a time-frequency domain resource beyond the first time region, for example, if the first time-frequency domain resource is a time-frequency domain resource in a transmission time period that is shorter than or equal to 0.5 ms, the information field of the first control information may include the information carried in the second information field, and a status of a bit of the second information field is set based on a status of the time-frequency domain resource not occupied by the downlink control channel or the time-frequency domain resource occupied by the downlink control channel or the time-frequency domain resource occupied by the downlink data channel. Specifically, the network device may add the second information field to the information field of the first control information, or may add the bit of the second information field to the first control information, and set the status of the bit of the second information field based on the status of the time-frequency domain resource not occupied by the downlink control channel or the time-frequency domain resource occupied by the downlink control channel or the time-frequency domain resource occupied by the downlink data channel; or if the second information field already exists in the information field of the first control information, or the bit of the second information field is already added, the network device may set the status of the bit of the second information field based on the status of the time-frequency domain resource not occupied by the downlink control channel or the time-frequency domain resource occupied by the downlink control channel or the time-frequency domain resource occupied by the downlink data channel, or may mark the status of the bit of the second information field as valid.

If the first time-frequency domain resource is in the first time region, the information field of the first control information may not include the information carried in the second information field. Specifically, the network device may not add the second information field to the information field of the first control information, that is, the quantity of bits of the first control information does not include the bit of the second information field; or if the second information field already exists in the information field of the first control information, the network device may determine that the second information field is in a reserved state, remove the second information field from the first control information, or remove the bit of the second information field from the first control information, where the reserved state means that the bit of the second information field is still in the first control information, but the status of the bit of the second information field is no longer valid or no longer has a meaning of indication information. A quantity of bits of the second information field may be determined by the network device or predefined. It should be noted that, the first time-frequency domain resource may not exist in a transmission time period that is shorter than or equal to 0.5 ms, or the first time-frequency domain resource is not all time-frequency domain resources in the transmission time period that is shorter than or equal to 0.5 ms.

For example, if the time-frequency domain resource for sending the first control information is in an sPDCCH region, the information field of the first control information includes the information carried in the second information field; or if the time-frequency domain resource for sending the first control information is in the PDCCH region or the time region to which the first one, two, three, or four symbols in the downlink subframe belong, the information field of the first control information does not include the information carried in the second information field.

Beneficial effects of this solution are as follows: When a PDCCH region exists in the first time region, because a PDCCH of a legacy user terminal exists in the PDCCH region, even if a time domain resource in "the time-frequency domain resource not occupied by the downlink control channel or the time-frequency domain resource occupied by the downlink control channel or the time-frequency domain resource occupied by the downlink data channel" is idle for use in the PDCCH region, the time domain resource cannot be used for transmitting data information. In this case, the first control information does not need to indicate "the time-frequency domain resource not occupied by the downlink control channel or the time-frequency domain resource occupied by the downlink data channel" in the first time region. However, beyond the first control region, the foregoing case in which an idle resource cannot be used for transmitting data does not exist. Therefore, when the first time-frequency domain resource is a time-frequency domain resource beyond the first time region, the information indicating "the time-frequency domain resource not occupied by the downlink control channel or the time-frequency domain resource occupied by the downlink control channel or the time-frequency domain resource occupied by the downlink data channel" is sent, and this part of resources are used for data transmission to improve resource utilization. When the first time-frequency domain resource is a time-frequency domain resource in the first time region, the information carried in the second information field is not sent. This reduces frequency of sending the information carried in the second information field, and reduces redundant information in the control information, thereby reducing time-frequency domain resources occupied by the control information, and improving system resource utilization.

Optionally, in another implementation scenario of this embodiment, the network device may determine whether the first control information includes information carried in a third information field. A corresponding processing procedure may be as follows: When the first time-frequency domain resource is a time-frequency domain resource in a second time region, the at least one information field includes the third information field.

The information carried in the third information field is used to trigger the user terminal to send a sounding reference signal SRS, and the second time region is configured by the network device or predefined.

The information carried in the third information field includes SRS request information.

In an implementation, the network device may determine whether the first time-frequency domain resource is in the second time region. If the first time-frequency domain resource is in the second time region, the information field of the first control information may include the information carried in the third information field, and a status of a bit of the third information field is set according to whether the user terminal is triggered to send the sounding reference signal SRS. Specifically, the network device may add the third information field to the information field of the first control information, or may add the bit of the second information field to the first control information, and set the status of the bit of the third information field according to whether the user terminal is triggered to send the sounding reference signal SRS; or if the third information field already exists in the information field of the first control information, or the bit of the third information field is already added, the network device may set the status of the bit of the third information field according to whether the user terminal is triggered to send the sounding reference signal SRS, or may mark the status of the bit of the third information field as valid.

If the first time-frequency domain resource is not in the second time region, the information field of the first control information may not include the information carried in the third information field. Specifically, the network device may not add the third information field to the information field of the first control information, that is, the quantity of bits of the first control information does not include the bit of the third information field; or if the third information field already exists in the information field of the first control information, the network device determines that a status of the third information field is a reserved state, removes the third information field from the first control information, or removes the bit of the third information field from the first control information, where the reserved state means that the bit of the third information field is still in the first control information, but the status of the bit of the third information field is no longer valid or no longer has a meaning of indication information. A quantity of bits of the third information field may be determined by the network device or predefined.

For example, the second time region may be a predefined sPDCCH region. If the time-frequency domain resource for sending the first control information is in the sPDCCH region, the information field of the first control information includes the information carried in the third information field. If the time-frequency domain resource for sending the first control information is not in the sPDCCH region (for example, in a PDCCH region or another sPDCCH region), the information field of the first control information does not include the information carried in the third information field.

Beneficial effects of this solution are as follows: Because a resource for sending an SRS is configured at a cell level, and currently in terms of most intensive SRS resources, the SRS is sent once every 2 ms, when control information is sent frequently, SRS request information in a plurality of pieces of control information may instruct the user terminal to send the same SRS. Based on processing in this solution, the network device sends the SRS request information to the user terminal only when the first time-frequency domain resource is in a specified time region. This can reduce frequency of sending the SRS request information, and reduce redundant information in the control information, thereby reducing time-frequency domain resources occupied by the control information, and improving system resource utilization.

Optionally, in another implementation scenario of this embodiment, the network device may determine whether the first control information includes information carried in a fourth information field. A corresponding processing procedure may be as follows: When the first time-frequency domain resource is a time-frequency domain resource in a third time region, the at least one information field includes the fourth information field.

The information carried in the fourth information field is used to trigger the user terminal to send channel quality information CSI, and the third time region is configured by the network device or predefined. Based on different configurations or predefinitions, the third time region may be the same as the second time region, or may be different from the second time region.

Optionally, the information carried in the fourth information field includes channel state information CSI indication information.

In an implementation, the network device may determine whether the first time-frequency domain resource is in the third time region. If the first time-frequency domain resource is in the third time region, the information field of the first control information may include the information carried in the fourth information field, and a status of a bit of the fourth information field is set according to whether the user terminal is triggered to send the channel quality information CSI. Specifically, the network device may add the fourth information field to the information field of the first control information, or may add the bit of the fourth information field to the first control information, and set the status of the bit of the fourth information field according to whether the user terminal is triggered to send the channel quality information CSI; or if the fourth information field already exists in the information field of the first control information, or the bit of the fourth information field is already added, the network device may set the status of the bit of the fourth information field according to whether the user terminal is triggered to send the channel quality information CSI, or may mark the status of the bit of the fourth information field as valid.

If the first time-frequency domain resource is not in the third time region, the information field of the first control information may not include the information carried in the fourth information field. Specifically, the network device may not add the fourth information field to the information field of the first control information, that is, the quantity of bits of the first control information does not include the bit of the fourth information field; or if the fourth information field already exists in the information field of the first control information, the network device determines that the fourth information field is in a reserved state, removes the fourth information field from the first control information, or removes the bit of the fourth information field from the first control information, where the reserved state means that the bit of the fourth information field is still in the first control information, but the status of the bit of the fourth information field is no longer valid or no longer has a meaning of indication information. A quantity of bits of the fourth information field may be determined by the network device or predefined.

In this solution, the third time region may be defined by using various methods. This embodiment provides two feasible manners.

Manner 1: The third time region is a fixed or predefined time region, such as a PDCCH region. This is not limited in this embodiment.

Manner 2: The third time region is determined based on a previous time of receiving CSI indication information of the user terminal by the network device.

In an implementation, the network device may send the control information including the CSI indication information to the user terminal; after successfully receiving the CSI indication information, the user terminal may send a receiving success response message to the network device; and then the network device may trigger a timer, and after preset duration in the timer expires, send the control information including the CSI indication information to the user terminal. However, before the preset duration in the timer expires, the network device does not send the CSI indication information to the user terminal, that is, the control information does not include the fourth information field. A specific manner of exclusion is the same as the foregoing manner, and is not described herein again.

Beneficial effects of this solution are as follows: Because a processing speed of the user terminal is limited, for example, at least several milliseconds are required from a measurement time period to a time for CSI feedback, when an interval for sending the control information is far shorter than a measurement period, CSI that is to be sent by the user terminal as triggered by CSI indication information in a plurality of pieces of control information may be corresponding to a same measurement time, that is, CSI content fed back by the user terminal is the same. The network device sends the CSI indication information to the user terminal only when the first time-frequency domain resource is in a specified time region. This can reduce frequency of sending the CSI indication information, and reduce redundant information in the control information, thereby reducing time-frequency domain resources occupied by the control information, and improving system resource utilization.

Figure 5:
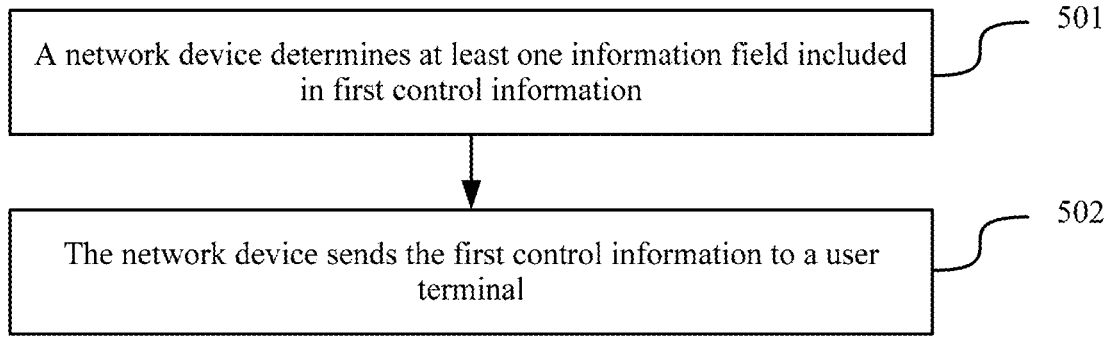
FIG. 5 is a flowchart of a method for sending control information according to an embodiment of the present application.

An embodiment further provides a method for sending control information. The method may be performed by a network device. As shown in FIG. 5, a processing procedure for the method may be as follows:

Step 501: The network device determines at least one information field included in first control information.

Information carried in the at least one information field may include at least one or any combination of the following:

(1) redundancy version information corresponding to information received and/or sent in at least one transmission time period;

(2) N, where N indicates N transmission time periods, the first control information is used to instruct a user terminal to receive information in the N transmission time periods and/or used to trigger the user terminal to send information in the N transmission time periods, and N is a positive integer greater than or equal to 1; and (3) information indicating whether uplink data is to be transmitted on an uplink channel in at least one transmission time period.

In an implementation, one or more of the at least one transmission time period may be duration shorter than or equal to 0.5 ms. Before sending the first control information to the user terminal, the network device needs to first determine the information field included in the first control information. The network device may use a solution in the prior art to determine the information field included in the first control information, or may use the solution in steps 401 to 403 to determine the information field included in the first control information. In this embodiment, there may be one or more pieces of first control information. If there are a plurality of pieces of first control information, correspondingly the method for sending control information according to the present application may be performed for each piece of control information. It should be noted that, the at least one transmission time period in this step may be the same as or different from the at least one transmission time period in steps 401 to 403. This is not limited in this embodiment.

Step 502: The network device sends the first control information to a user terminal.

In an implementation, a total quantity of bits sent by the network device to the user terminal may be greater than or equal to a quantity of bits of the first control information. For example, a cyclic prefix check code CRC is added to the first control information to reduce a reception error probability, or the total quantity of bits is set to be the same as that of control information in another format to reduce a quantity of times of blind detection by the user terminal, (for example, 0 is added until the total quantity of bits is the same as that of the control information in the another format).

Optionally, in an implementation scenario of this embodiment, the at least one information field may include a first information field, and information carried in the first information field includes the redundancy version information corresponding to the information received and/or sent in the at least one transmission time period; and before sending the first control information to the user terminal, the network device may further perform the following processing: The network device determines M, where the at least one transmission time period is M transmission time periods, and M is a positive integer greater than or equal to 1; and the network device determines a status of at least one bit of the first information field based on M, a quantity of bits of the first information field, and the redundancy version information corresponding to the information received and/or sent in the M transmission time periods.

The network device determines the quantity of bits of the first information field. Specifically, the quantity of bits of the first information field may be fixed or predefined, or the quantity of bits is determined by performing steps 401 to 403 or in another manner. This is not limited in this embodiment. The quantity of bits of the first information field is a quantity of bits of the information included in the first information field or a quantity of bits included in the first information field.

M indicates that the user terminal is to receive information in the M transmission time periods and/or is used to trigger the user terminal to send information in the M transmission time periods.

In an implementation, the network device may determine a quantity of transmission time periods for receiving information by the user terminal, and/or a quantity (M) of transmission time periods for sending information by the user terminal, where M may be determined by the network device based on the first control information or other control information, or may be determined based on higher layer signaling sent by the network device to the user terminal, or may be allocated by the network device to the user terminal based on a traffic volume of the user terminal, or may be determined by the network device by itself. The network device may prestore a correspondence between a quantity of transmission time periods, the quantity of bits of the first information field, the status of the bit of the first information field, and the redundancy version information corresponding to the information received and/or sent in the at least one transmission time period. The network device may determine the status of the at least one bit of the first information field based on the correspondence, M, the quantity of bits of the first information field, and the redundancy version information corresponding to the information received and/or sent in the M transmission time periods. The M transmission time periods may be continuous or discontinuous. This is not limited in this embodiment.

The correspondence may be specifically as follows: When the quantity of bits of the first information field is X, where a value of X may be configured based on higher layer signaling, fixed, or predefined, the network device may determine, based on a relationship between values of X and M, a quantity of bits indicating a redundancy version, and further determine the status of the at least one bit of the first information field based on a redundancy version corresponding to the information received and/or sent in the M transmission time periods. Three cases are included as follows:

(1) When M is greater than X, one bit in X is used to indicate information about the redundancy version, and one state of the at least one bit is corresponding to one redundancy version in at least two transmission time periods. A state 0 of the bit is corresponding to a redundancy version 0, and a state 1 of the bit is corresponding to a redundancy version 2, or vice versa. Herein a status of the bit and a value of the redundancy version are not specifically limited.

For example, if M is equal to 5 and X is equal to 4, at least one bit in X indicates that same redundancy version information is used in two transmission time periods, where the redundancy version information is (0, 2). M means that five transmission time periods are scheduled, including {a first transmission time period, . . . , a fifth transmission time period}. The first information field includes four bits, {a, b, c, d}. For example, the bit a may be corresponding to redundancy versions in the first transmission time period and the second transmission time period, the bit b may be corresponding to a redundancy version in the third transmission time period, the bit c may be corresponding to a redundancy version in the fourth transmission time period, and the bit d may be corresponding to a redundancy version in the fifth transmission time period; or the bit a may be corresponding to a redundancy version in the first transmission time period, the bit b may be corresponding to a redundancy version in the second transmission time period, the bit c is may be corresponding to a redundancy version in the third transmission time period, and the bit d may be corresponding to redundancy versions in the fourth transmission time period and the fifth transmission time period.

For example, if M is equal to 6 and X is equal to 4, one bit in X indicates that same redundancy version information is used in two or three transmission time periods, where the redundancy version information is (0, 2). Specifically, two or three transmission time periods may be predefined. M means that six transmission time periods are scheduled, including {a first transmission time period, . . . , a sixth transmission time period}. The first information field includes four bits, {a, b, c, d}. For example, the bit a may be corresponding to a redundancy version in the first transmission time period, the bit b may be corresponding to a redundancy version in the second transmission time period, the bit c may be corresponding to a redundancy version in the third transmission time period, and the bit d may be corresponding to redundancy versions in the fourth transmission time period, the fifth transmission time period, and the sixth transmission time period; or the bit a may be corresponding to a redundancy version in the first transmission time period, the bit b may be corresponding to a redundancy version in the second transmission time period, the bit c may be corresponding to redundancy versions in the third transmission time period and the fourth transmission time period, and the bit d may be corresponding to redundancy versions in the fifth transmission time period and the sixth transmission time period.

(2) When M is less than X and M is greater than a first preset threshold, one state of each bit in X is corresponding to a redundancy version in a maximum of one TTI. The first preset threshold is a positive integer, and may be obtained by rounding down X/2 or X/3. This is not limited in this embodiment.

For example, if M is equal to 3, X is equal to 4, and the first preset threshold is 2, one state of at least one bit may be corresponding to redundancy version information in one transmission time period, where the redundancy version information is (0, 2). For example, M means that three transmission time periods are scheduled, including {a first transmission time period, . . . , a third transmission time period}. The first information field includes four bits, {a, b, c, d}. For example, the bit a may be corresponding to a redundancy version in the first transmission time period, the bit b may be corresponding to a redundancy version in the second transmission time period, and the bit c may be corresponding to a redundancy version in the third transmission time period; or the bit b may be corresponding to a redundancy version in the first transmission time period, the bit c may be corresponding to a redundancy version in the second transmission time period, the bit d may be corresponding to a redundancy version in the third transmission time period.

(3) When M is less than or equal to a first preset threshold, one state of every i bits is corresponding to a redundancy version in a maximum of one TTI. The first preset threshold is a positive integer, and may be obtained by rounding down X/i, where i is a positive integer greater than or equal to 1.

For example, if M is equal to 2, X is equal to 4, and i is equal to 2 or the first preset threshold is 2, one state of at least two bits is corresponding to a redundancy version in one TTI, and the redundancy version is (0, 1, 2, 3). For example, M means that two transmission time periods are scheduled, including {a first transmission time period, a second transmission time period}. The first information field includes four bits, {a, b, c, d}. For example, the bit a and the bit b may be corresponding to a redundancy version in the first transmission time period, and the bit c and the bit d may be corresponding to a redundancy version in the second transmission time period; or the bit a and the bit b may be corresponding to a redundancy version in the second transmission time period, and the bit c and the bit d may be corresponding to a redundancy version in the first transmission time period.

It should be noted that, in this solution, M may be the same as N, or may be different from N.

Beneficial effects of this solution are as follows: In the prior art, each TTI is corresponding to a redundancy version in one or two bits. If N sTTIs are scheduled, each piece of control information includes redundancy version information in N bits to 2N bits. However, based on this solution, a fixed bit may be used to indicate a redundancy version. This can reduce a quantity of bits of the information in the information field, reduce time-frequency domain resources occupied by the control information, and improve system resource utilization.

Optionally, in another implementation scenario of this embodiment, the at least one information field includes a second information field, and information carried in the second information field includes N; and before sending the first control information to the user terminal, the network device may further perform the following processing: The network device determines a status of at least one bit of the second information field based on N and a first correspondence, where the first correspondence is a correspondence between the status of the at least one bit and N, and the first correspondence is configured by the network device or predefined.

N indicates N transmission time periods, the first control information is used to instruct the user terminal to receive information in the N transmission time periods and/or used to trigger the user terminal to send information in the N transmission time periods, and N is a positive integer greater than or equal to 1.

In an implementation, a quantity of bits of the second information field may be fixed or predefined, or may be determined based on duration of a transmission time period.

Case 1: The quantity of bits of the second information field is fixed or predefined.

The case 1 may be applicable to scheduling of a plurality of transmission time periods that are shorter than or equal to 0.5 ms, or may be applicable to scheduling of a plurality of transmission time periods of 1 ms. Correspondingly, a quantity of elements in a quantity set of transmission time periods that may be indicated by the second information field is determined by the quantity of bits of the second information field. For example, if the quantity of bits is n, a maximum quantity of elements in the quantity set is $2^n$. A value represented by each element in the quantity set may be configured by the user terminal based on higher layer signaling or predefined.

For example, if the quantity of bits of the second information field is 2, the quantity set of the transmission time periods indicated by the second information field may be defined as (1, alt 1, alt 2, alt 3), where alt 1 to alt 3 are corresponding to quantities of sTTIs that are continuously scheduled, alt 1 to alt 3 are configured by the user terminal based on higher layer signaling, and the higher layer signaling may be RRC configuration information. alt 1 to alt 3 may alternatively be predefined values. The following uses an example in which the quantity of bits of the second information field is 2. The correspondence in this specification is not limited. To be specific, in another correspondence, 00 may alternatively be corresponding to alt 3 or corresponding to a quantity 3.

TABLE 1

| State of bits of the second information field | Quantity of transmission time periods |
|---|---|
| 00 | 1 |
| 01 | alt 1 |
| 11 | alt 2 |
| 10 | alt 3 |

TABLE 2

| State of bits of the second information field | Quantity of transmission time periods |
|---|---|
| 00 | 1 |
| 01 | 2 |
| 11 | 3 |
| 10 | 6 |

Case 2: The quantity of bits of the second information field is variable.

The case 2 may be applicable to scheduling of a plurality of transmission time periods that are shorter than or equal to 0.5 ms. The network device may determine the quantity of bits of the second information field based on duration of a scheduled transmission time period, and then determine the status of the at least one bit of the second information field based on N and the first correspondence.

For example, if the duration of the transmission time period is seven symbols, the quantity of bits of the second information field is 1; if the duration of the transmission time period is four symbols, the quantity of bits of the second information field is 2; or if the duration of the transmission time period is two symbols, the quantity of bits of the second information field is 3. The following uses an example in which the duration of the transmission time period is two symbols, and the quantity of bits of the second information field is 3. The correspondence in this specification is not limited. To be specific, in another correspondence, 000 may alternatively be corresponding to 4.

TABLE 3

| State of bits of the second information field | Quantity of transmission time periods |
|---|---|
| 000 | 1 |
| 001 | 2 |
| 011 | 3 |
| 010 | 4 |
| 100 | 5 |
| 101 | 6 |
| 111 | Reserved |
| 110 | Reserved |

It should be noted that, content of the first correspondence in the case 1 may be different from content of the first correspondence in the case 2.

Beneficial effects of this solution are as follows: In the prior art, control information includes a fixed quantity of bits that may satisfy a maximum quantity of scheduled TTIs, for example, three bits. In this solution, a quantity of bits of information in the information field can be reduced, and a quantity of bits indicating a maximum quantity of TTIs that are continuously scheduled does not need to be included. This can reduce time-frequency domain resources occupied by the control information, and improve system resource utilization.

Optionally, in another implementation scenario of this embodiment, the at least one information field includes a third information field, and information carried in the third information field includes the information indicating whether the uplink data is to be transmitted on the uplink channel in the at least one transmission time period; and before sending the first control information to the user terminal, the network device may further perform the following processing: The network device determines P, where P indicates that the user terminal is to receive information in P transmission time periods and/or indicates that the user terminal is to send information in the P transmission time periods, and P is a positive integer greater than or equal to 1.

The network device may compare P with 1.

In an implementation, when P is greater than 1, the network device may determine that the third information field is an information field of K bits, and that the information carried in the third information field indicates whether the uplink data is to be transmitted on the uplink channel in K transmission time periods in the P transmission time periods, where K is a positive integer greater than or equal to 1 and less than or equal to P. To be specific, the third information field may be used to indicate that the uplink data is to be transmitted on the uplink channel in a part of the K transmission time periods, and that no uplink data is to be transmitted on the uplink channel in other parts of the K transmission time periods. For example, when a quantity of scheduled transmission time periods is greater than 1, a status of one of K bits may be used to indicate that the uplink data is to be transmitted on the uplink channel in a transmission time period corresponding to the one bit, or that no uplink data is to be transmitted on the uplink channel in a transmission time period corresponding to the one bit. For another example, when a quantity of scheduled transmission time periods is greater than 1, data of one bit may be used to indicate that the uplink data is to be transmitted in a predefined sTTI, or data of one bit may be used to indicate that no uplink data is to be transmitted in a predefined sTTI.

When P is equal to 1, the network device determines that the third information field is a modulation and coding scheme MCS information field, and that the third information field is used to indicate whether the uplink data is to be transmitted on the uplink channel in one transmission time period, where a state 29 of a bit in the MCS information field may be used to indicate that no uplink data is to be transmitted on the uplink channel in the transmission time period.

It should be noted that, in this solution, P may be the same as N, or may be different from N. P and K may be determined by the network device based on the first control information or other control information, or may be determined based on higher layer signaling sent by the network device to the user terminal, or may be allocated by the network device to the user terminal based on a traffic volume of the user terminal, or may be determined by the network device by itself. Details are not described herein again.

After determining the third information field, the network device determines a status of a bit of the third time domain information field according to whether the uplink data is to be transmitted on the uplink channel in the K transmission time periods, or determines a status of a bit of the third time domain information field according to whether the uplink data is to be transmitted on the uplink channel in one transmission time period.

Beneficial effects of this solution are as follows: In the prior art, when a plurality of TTIs are scheduled, to reduce overheads, control information includes only one MCS information field, that is, information in the plurality of TTIs is transmitted by using a same MCS. If the state 29 of the bit in the MCS information field is still used to indicate indication information about whether uplink data is to be transmitted in a TTI, it can only indicate that the uplink data is to be transmitted in all TTIs or that the uplink data is not to be transmitted in any TTI. However, actually, only one TTI is not used for transmitting the uplink data, and consequently resources are wasted. In this solution, the indication information may be sent in one control message to indicate whether the uplink data is to be transmitted in a TTI, and therefore system resource utilization is improved.

In addition, this embodiment further provides a method for indicating whether uplink data is to be transmitted on an uplink channel in at least one transmission time period. A processing procedure for the method may be as follows: A network device sends first control information, where the first control information includes an indication of scheduling information of a user terminal in at least one transmission time period having first duration, the scheduling information is used to trigger the user terminal to receive information in the transmission time period and/or indicate that the user terminal is to send information in P transmission time periods, and the first duration is duration shorter than or equal to 0.5 ms; and the network device sends second control information, where the second control information is used to indicate whether uplink data is to be transmitted on an uplink channel in one of the at least one transmission time period.

In the method, after sending the first control information, the network device may separately send a piece of control information (that is, the second control information) to indicate whether the user terminal is to transmit the uplink data on the uplink channel in one of the at least one transmission time period.

Figure 6:
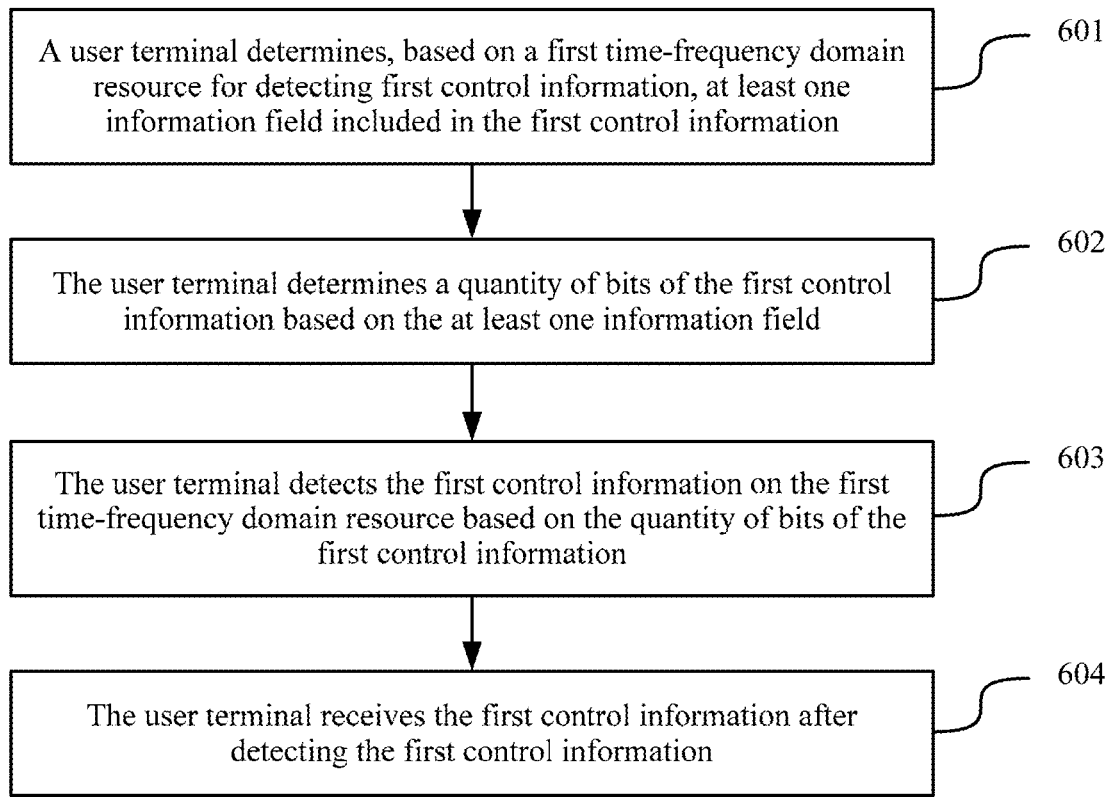
FIG. 6 is a flowchart of a method for detecting control information according to an embodiment of the present application.

An embodiment provides a method for detecting control information. The method may be performed by a user terminal. As shown in FIG. 6, a processing procedure for the method may be as follows:

Step 601: The user terminal determines, based on a first time-frequency domain resource for detecting first control information, at least one information field included in the first control information.

The first time-frequency domain resource is a time-frequency domain resource for transmitting the first control information, and the first time-frequency domain resource includes at least one of the following three items: a time-frequency domain resource in a PDCCH region, a time-frequency domain resource in a time region to which first one, two, three, or four symbols in a downlink subframe belong, and a time-frequency domain resource in a transmission time period that is shorter than or equal to 0.5 ms. The first time-frequency domain resource may also be referred to as a first control region or a first downlink control channel region. For example, when the first time-frequency domain resource is a time-frequency domain resource in a time region to which first three symbols in a downlink subframe belong, and the downlink subframe is a subframe with an NCP, the first time-frequency domain resource includes symbols whose sequence numbers are #0, #1, and #2 in a first slot of the downlink subframe.

In an implementation, the user terminal may detect the control information in one or more time-frequency domain resources (the first time-frequency domain resource). After detecting the first control information, the user terminal may determine the first time-frequency domain resource for transmitting the first control information, and further determine, based on the first time-frequency domain resource, the at least one information field included in the first control information.

In this embodiment, when time-frequency domain resources for transmitting the first control information are different, information fields included in the first control information may be different or may be the same. In an implementation method, when the first time-frequency domain resource for sending the first control information is a time domain resource B, the first control information includes a first information field; or when the first time-frequency domain resource for sending the first control information is a time domain resource C, the first control information does not include a first information field. In another implementation method, when the first time-frequency domain resource for sending the first control information is a time domain resource B, the first control information includes a first information field, and the first information field is used to indicate first sub information; or when the first time-frequency domain resource for sending the first control information is a time domain resource C, the first control information includes a first information field, but the first information field is not used to indicate first sub information or is reserved and not used.

In this embodiment, there may be one or more pieces of first control information. If there are a plurality of pieces of first control information, correspondingly the method for sending control information according to the present application may be performed for each piece of control information.

Step 602: The user terminal determines a quantity of bits of the first control information based on the at least one information field.

In an implementation, after determining the information field included in the first control information, the user terminal may determine a quantity of bits of each information field, and further determine a sum of quantities of bits of all information fields to obtain the quantity of bits of the first control information.

Step 603: The user terminal detects the first control information on the first time-frequency domain resource based on the quantity of bits of the first control information.

In an implementation, a total quantity of bits sent by a network device to the user terminal may be greater than or equal to the quantity of bits of the first control information. For example, a cyclic prefix check code CRC is added to the first control information to reduce a reception error probability, or the total quantity of bits is set to be the same as that of control information in another format to reduce a quantity of times of blind detection by the user terminal, (for example, 0 is added until the total quantity of bits is the same as that of the control information in the another format). The user terminal may determine the total quantity of bits based on the quantity of bits of the first control information, and then detect the first control information on the first time-frequency domain resource based on the total quantity of bits.

Step 604: The user terminal receives the first control information after detecting the first control information.

Optionally, in an implementation scenario of this embodiment, the user terminal may determine whether the first control information includes information carried in the first information field. A corresponding processing procedure may be as follows: When the first time-frequency domain resource is a time-frequency domain resource in a first time region, the at least one information field includes the first information field.

The information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region. It should be noted that, the physical downlink control channel PDCCH region is in several start symbols of a subframe, a base station notifies all user terminals, served by a cell, of the PDCCH region by using a PCFICH channel, and the PDCCH region may vary in subframes. However, first one, two, three, or four symbols in a downlink subframe may be larger than, smaller than, or equal to a PDCCH region of the downlink subframe.

In an implementation, the at least two control information formats may include a control information format indicating a TTI of 1 ms, such as a DCI format 0, a DCI format 1, a DCI format 2, or a DCI format 4, and a format of a TTI shorter than 1 ms, such as a DCI format 7A or a DCI format 7B; or the at least two control information formats may include a first control information format and a second control information format, such as a DCI format 0 and a DCI format 7A. Numbers of the foregoing specific formats are not limited. The at least two time lengths may include duration of 1 ms and duration shorter than 1 ms. Herein the duration may indicate that the user terminal is to receive information or send information in the duration.

The information carried in the first information field includes format differentiation indication information or TTI duration indication information.

The user terminal may determine whether the first time-frequency domain resource is in the first time region. If the first time-frequency domain resource is in the first time region, the user terminal may determine that the information field of the first control information may include the information carried in the first information field. If the first time-frequency domain resource is not in the first time region, for example, if the first time-frequency domain resource is a time-frequency domain resource in a transmission time period that is shorter than or equal to 0.5 ms, the user terminal may determine that the first control information does not include the information carried in the first information field. Specifically, the information field of the first control information may not include the first information field, or the information field of the first control information includes the first information field but the first information field does not carry information used to indicate one of at least two control information formats or used to indicate one of at least two time lengths, or the information field of the first control information includes the first information field but the user terminal does not receive information that is carried in the first information field and that is used to indicate one of at least two control information formats or used to indicate one of at least two time lengths. A quantity of bits of the first information field may be determined by the user terminal or predefined. It should be noted that, the first time-frequency domain resource may not exist in a transmission time period that is shorter than or equal to 0.5 ms, or the first time-frequency domain resource may be a part of time-frequency domain resources in a transmission time period that is shorter than or equal to 0.5 ms.

For example, if the time-frequency domain resource for detecting the first control information is in the PDCCH region, the information field of the first control information includes the first information field; or if the time-frequency domain resource for detecting the first control information is in an sPDCCH region, the information field of the first control information does not include the first information field, where the sPDCCH region may be a time region of downlink control information in a transmission time period that is shorter than or equal to 0.5 ms, or may be a transmission time period that is shorter than or equal to 0.5 ms. For example, the transmission time period is a 2-symbol TTI, and the sPDCCH region may be one symbol of the 2-symbol TTI or may be the 2-symbol TTI. For another example, if the time-frequency domain resource for detecting the first control information is in the time region to which the first one, two, three, or four symbols in the downlink subframe belong, the information field of the first control information includes the first information field; or if the time-frequency domain resource for detecting the first control information is not in the time region to which the first one, two, three, or four symbols in the downlink subframe belong, the first control information does not include the information carried in the first information field. Specifically, the information field of the first control information does not include the first information field, or the information field of the first control information includes the first information field but the first information field does not carry information used to indicate one of at least two control information formats or used to indicate one of at least two time lengths, or the information field of the first control information includes the first information field but the user terminal does not receive information that is carried in the first information field and that is used to indicate one of at least two control information formats or used to indicate one of at least two time lengths.

After detecting the first control information, the user terminal may receive the first control information, and determine, based on a status of a bit of the first information field, the information carried in the first information field included in the first control information, such as a control information format or duration.

Beneficial effects of this solution are as follows: The control information sent by the base station to the user terminal may be control information used to indicate a TTI of 1 ms, or may be control information used to indicate a short TTI that is shorter than 1 ms. Therefore, to reduce a quantity of times of blindly detecting the control information by the user terminal, the base station may set quantities of bits in the two types of control information to be the same, and use the first information field of the first control information to indicate specific control information to be used at this time. However, when the first time-frequency domain resource is in a time region other than the time region in the downlink subframe, the control information sent by the base station to the user terminal can only be control information used to indicate a short TTI that is shorter than 1 ms. Based on this, in this solution, the user terminal detects the first control information including the information carried in the first information field, only when the first time-frequency domain resource is in the first time region; in other cases, the user terminal detects the first control information excluding the information carried in the first information field. This further reduces the quantity of bits of the information in the information field, that is, reduces resources occupied by the control information, and improves resource utilization, while ensuring that actions of the user terminal and the base station are consistent and that the control information can be received correctly.

Optionally, in another implementation scenario of this embodiment, the user terminal may determine whether the first control information includes information carried in a second information field. A corresponding processing procedure may be as follows: When the first time-frequency domain resource is a time-frequency domain resource beyond a first time region, the at least one information field includes the second information field.

The information carried in the second information field is used to indicate a time-frequency domain resource not occupied by a downlink control channel or used to indicate a time-frequency domain resource occupied by a downlink control channel or used to indicate a time-frequency domain resource occupied by a downlink data channel. The downlink control channel may be a PDCCH (physical downlink control channel). The first time region is a time region to which first one, two, three, or four symbols in a downlink subframe belong, or is a physical downlink control channel PDCCH region.

The information carried in the second information field is information indicating resource usage of the downlink data channel.

In an implementation, the information carried in the second information field may include the time-frequency domain resource not occupied by the downlink control channel or is used to indicate the time-frequency domain resource occupied by the downlink control channel or is used to indicate the time-frequency domain resource occupied by the downlink data channel. The time-frequency domain resource occupied by the downlink control channel may include a CCE occupied by the downlink control channel for carrying DCI in a transmission time period, or a resource block RB occupied by the downlink control channel in a transmission time period, or a resource element RE occupied by the downlink control channel in a transmission time period. The time-frequency domain resource not occupied by the downlink control channel may include a CCE not occupied by the downlink control channel for carrying DCI in a transmission time period, or a resource block RB not occupied by the downlink control channel in a transmission time period, or a resource element RE not occupied by the downlink control channel in a transmission time period. The time-frequency domain resource occupied by the downlink data channel may include a resource block RB occupied by the downlink data channel in a transmission time period, or a resource element RE occupied by the downlink data channel in a transmission time period. It should be noted that, in this embodiment, a transmission time period may be a 2-symbol transmission time period, a transmission time period that is shorter than or equal to 0.5 ms, or a transmission time period that is 1 ms.

The user terminal may determine whether the first time-frequency domain resource is a time-frequency domain resource in the first time region. If the first time-frequency domain resource is a time-frequency domain resource beyond the first time region, for example, if the first time-frequency domain resource is a time-frequency domain resource in a transmission time period that is shorter than or equal to 0.5 ms, the user terminal may determine that the information field of the first control information may include the information carried in the second information field. If the first time-frequency domain resource is in the first time region, the user terminal may determine that the first control information does not include the information carried in the second information field. Specifically, the information field of the first control information may not include the second information field, or the information field of the first control information includes the second information field but the second information field does not carry the information used to indicate the time-frequency domain resource not occupied by the downlink control channel or used to indicate the time-frequency domain resource occupied by the downlink control channel or used to indicate the time-frequency domain resource occupied by the downlink data channel, or the information field of the first control information includes the second information field but the user terminal does not receive the information that is carried in the second information field and that is used to indicate the time-frequency domain resource not occupied by the downlink control channel or used to indicate the time-frequency domain resource occupied by the downlink control channel or used to indicate the time-frequency domain resource occupied by the downlink data channel. A quantity of bits of the second information field may be determined by the user terminal or predefined. It should be noted that, the first time-frequency domain resource may not exist in a transmission time period that is shorter than or equal to 0.5 ms, or the first time-frequency domain resource is not all time-frequency domain resources in the transmission time period that is shorter than or equal to 0.5 ms.

For example, if the time-frequency domain resource for detecting the first control information is in an sPDCCH region, the information field of the first control information includes the information carried in the second information field; or if the time-frequency domain resource for detecting the first control information is in the PDCCH region or the time region to which the first one, two, three, or four symbols in the downlink subframe belong, the first control information does not include the information carried in the second information field. Specifically, the information field of the first control information does not include the second information field, or the information field of the first control information includes the second information field but the second information field does not carry the information used to indicate the time-frequency domain resource not occupied by the downlink control channel or used to indicate the time-frequency domain resource occupied by the downlink control channel or used to indicate the time-frequency domain resource occupied by the downlink data channel, or the information field of the first control information includes the second information field but the user terminal does not receive the information that is carried in the second information field and that is used to indicate the time-frequency domain resource not occupied by the downlink control channel or used to indicate the time-frequency domain resource occupied by the downlink control channel or used to indicate the time-frequency domain resource occupied by the downlink data channel.

After detecting the first control information, the user terminal may receive the first control information, and determine, based on a status of a bit of the second information field, the information carried in the included second information field, or the time-frequency domain resource not occupied by the downlink control channel, or the time-frequency domain resource occupied by the downlink control channel, or the time-frequency domain resource occupied by the downlink data channel.

It should be noted that, the downlink control channel in this solution may be an uplink data channel and a downlink data channel in a time period.

Beneficial effects of this solution are as follows: When a PDCCH region exists in the first time region, because a PDCCH of a legacy user terminal exists in the PDCCH region, even if a time domain resource in "the time-frequency domain resource not occupied by the downlink control channel or the time-frequency domain resource occupied by the downlink control channel or the time-frequency domain resource occupied by the downlink data channel, as indicated by the information carried in the second information field" is idle for use in the PDCCH region, the time domain resource cannot be used for transmitting data information. Therefore, the first control information does not need to indicate "the time-frequency domain resource not occupied by the downlink control channel or the time-frequency domain resource occupied by the downlink data channel" in the first time region. However, beyond the first control region, the foregoing case in which an idle resource cannot be used for transmitting data does not exist. In this case, when the first time-frequency domain resource is a time-frequency domain resource beyond the first time region, the first control information including the information carried in the second information field is detected, and this part of resources are used for data transmission to improve resource utilization. When the first time-frequency domain resource is a time-frequency domain resource in the first time region, the user terminal detects the first control information including the information carried in the second information field. This further reduces the quantity of bits of the information in the information field, that is, reduces resources occupied by the control information, and improves resource utilization, while ensuring that actions of the user terminal and the base station are consistent and that the control information can be received correctly.

Optionally, in another implementation scenario of this embodiment, the user terminal may determine whether the first control information includes information carried in a third information field. A corresponding processing procedure may be as follows: When the first time-frequency domain resource is a time-frequency domain resource in a second time region, the at least one information field includes the third information field.

The information carried in the third information field is used to trigger the user terminal to send a sounding reference signal SRS, and the second time region is determined by the user terminal based on received higher layer signaling or predefined.

In an implementation, the user terminal may determine whether the first time-frequency domain resource is in the second time region. If the first time-frequency domain resource is in the second time region, the user terminal may determine that the information field of the first control information may include the information carried in the third information field, and therefore may determine, based on a status of a bit of the third information field, whether to send the sounding reference signal SRS. If the first time-frequency domain resource is not in the second time region, the user terminal may determine that the first control information does not include the information carried in the third information field. Specifically, the information field of the first control information may not include the third information field, or the information field of the first control information includes the third information field but the third information field does not carry the information used to trigger the user terminal to send the sounding reference signal SRS, or the information field of the first control information includes the third information field but the user terminal does not receive the information that is carried in the third information field and that is used to trigger the user terminal to send the sounding reference signal SRS. A quantity of bits of the third information field may be determined by the user terminal or predefined.

The information carried in the third information field includes SRS request information.

For example, the second time region may be a predefined sPDCCH region. If the time-frequency domain resource for detecting the first control information is in the sPDCCH region, the information field of the first control information includes the third information field; or if the time-frequency domain resource for detecting the first control information is not in the sPDCCH region (for example, in a PDCCH region or another sPDCCH region), the first control information does not include the information carried in the third information field. Specifically, the information field of the first control information does not include the third information field, or the information field of the first control information includes the third information field but the third information field does not carry the information used to trigger the user terminal to send the sounding reference signal SRS, or the information field of the first control information includes the third information field but the user terminal does not receive the information that is carried in the third information field and that is used to trigger the user terminal to send the sounding reference signal SRS.

Beneficial effects of this solution are as follows: Because a resource for sending an SRS is configured at a cell level, and currently in terms of most intensive SRS resources, the SRS is sent once every 2 ms, when control information is sent frequently, SRS request information in a plurality of pieces of control information may instruct the user terminal to send the same SRS. Based on processing in this solution, when the first time-frequency domain resource is in a predefined time region, the user terminal detects the first control information including the information carried in the second information field, for example, the first control information including the SRS request information. This further reduces the quantity of bits of the information in the information field, that is, reduces resources occupied by the control information, and improves resource utilization, while ensuring that actions of the user terminal and the base station are consistent and that the control information can be received correctly.

Optionally, in another implementation scenario of this embodiment, the user terminal may determine whether the first control information includes information carried in a fourth information field. A corresponding processing procedure may be as follows: When the first time-frequency domain resource is a time-frequency domain resource in a third time region, the at least one information field includes the fourth information field.

The information carried in the fourth information field is used to trigger the user terminal to send channel quality information CSI, and the third time region is determined by the user terminal based on received higher layer signaling or predefined. Based on different configurations or predefinitions, the third time region may be the same as the second time region, or may be different from the second time region.

Optionally, the information carried in the fourth information field includes periodic channel state information CSI indication information.

In an implementation, the user terminal may determine whether the first time-frequency domain resource is in the third time region. If the first time-frequency domain resource is in the third time region, the user terminal may determine that the information field of the first control information may include the information carried in the fourth information field, and therefore may determine, based on a status of a bit of the fourth information field, whether to send the channel quality information CSI. If the first time-frequency domain resource is not in the third time region, the user terminal may determine that the first control information does not include the information carried in the fourth information field. Specifically, the information field of the first control information may not include the fourth information field, or the information field of the first control information includes the fourth information field but the fourth information field does not carry the information used to trigger the user terminal to send the channel quality information CSI, or the information field of the first control information includes the fourth information field but the user terminal does not receive the information that is carried in the fourth information field and that is used to trigger the user terminal to send the channel quality information CSI. A quantity of bits of the fourth information field may be determined by the user terminal or predefined.

In this solution, the third time region may be defined by using various methods. This embodiment provides two feasible manners.

Manner 1: The third time region is a fixed or predefined time region, such as a PDCCH region. This is not limited in this embodiment.

Manner 2: The third time region is determined based on a previous time of receiving CSI indication information of the user terminal by the network device.

In an implementation, the network device may send the control information including the CSI indication information to the user terminal; after successfully receiving the CSI indication information, the user terminal may send a receiving success response message to the network device; and then the user terminal may trigger a timer, and after preset duration in the timer expires, the third time region arrives. The user terminal may start to detect the control information including the CSI indication information. However, before the preset duration in the timer expires, the user terminal does not detect the control information including the information carried in the fourth information field. To be specific, the information field of the first control information may not include the fourth information field, or the information field of the first control information includes the fourth information field but the fourth information field does not carry the information used to trigger the user terminal to send the channel quality information CSI, or the information field of the first control information includes the fourth information field but the user terminal does not receive the information that is carried in the fourth information field and that is used to trigger the user terminal to send the channel quality information CSI. A specific manner of exclusion is the same as the foregoing manner, and is not described herein again.

Beneficial effects of this solution are as follows: Because a processing speed of the user terminal is limited, for example, at least several milliseconds are required from a measurement time period to a time for CSI feedback, when an interval for sending the control information is far shorter than a measurement period, CSI that is to be sent by the user terminal as triggered by CSI indication information in a plurality of pieces of control information may be corresponding to a same measurement time, that is, CSI content fed back by the user terminal is the same. When the first time-frequency domain resource is in a predefined time region, the user terminal detects the first control information including the information carried in the fourth information field, for example, the first control information including the CSI indication information. This further reduces the quantity of bits of the information in the information field, that is, reduces resources occupied by the control information, and improves resource utilization, while ensuring that actions of the user terminal and the base station are consistent and that the control information can be received correctly.

Figure 7:
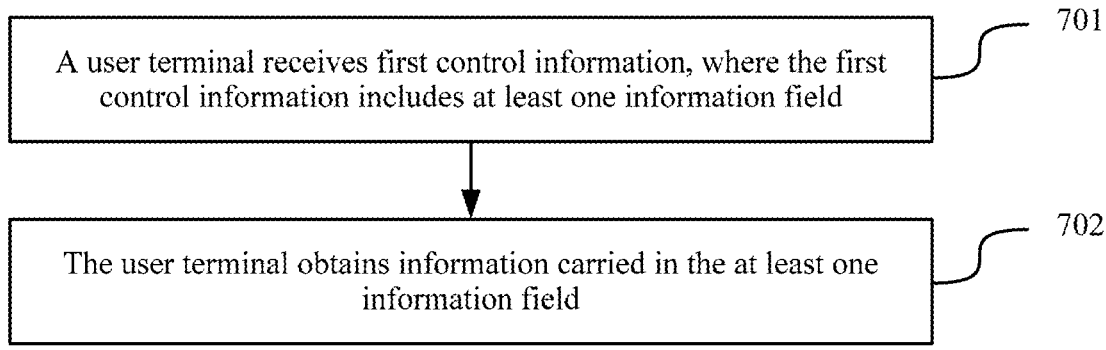
FIG. 7 is a flowchart of a method for detecting control information according to an embodiment of the present application.

An embodiment further provides a method for detecting control information. The method may be performed by a user terminal. As shown in FIG. 7, a processing procedure for the method may be as follows:

Step 701: The user terminal receives first control information, where the first control information includes at least one information field.

Information carried in the at least one information field includes at least one or any combination of the following:

(1) redundancy version information corresponding to information received and/or sent in at least one transmission time period;

(2) N, where N indicates N transmission time periods, the first control information is used to instruct the user terminal to receive information in the N transmission time periods and/or used to trigger the user terminal to send information in the N transmission time periods, and N is a positive integer greater than or equal to 1; and (3) information indicating whether uplink data is to be transmitted on an uplink channel in at least one transmission time period.

In an implementation, one or more of the at least one transmission time period may be duration shorter than or equal to 0.5 ms. The user terminal may use a solution in the prior art to determine the information field included in the first control information, or may use the solution in steps 601 to 603 to determine the information field included in the first control information. In this embodiment, there may be one or more pieces of first control information. If there are a plurality of pieces of first control information, correspondingly the method for sending control information according to the present application may be performed for each piece of control information. It should be noted that, the at least one transmission time period in this step may be the same as or different from the at least one transmission time period in steps 601 to 603. This is not limited in this embodiment.

In addition, a total quantity of bits sent by a network device to the user terminal may be greater than or equal to a quantity of bits of the first control information. For example, a cyclic prefix check code CRC is added to the first control information to reduce a reception error probability, or the total quantity of bits is set to be the same as that of control information in another format to reduce a quantity of times of blind detection by the user terminal, (for example, 0 is added until the total quantity of bits is the same as that of the control information in the another format).

Step 702: The user terminal obtains information carried in the at least one information field.

In an implementation, the user terminal may detect the at least one information field to obtain the information carried in the at least one information field.

Optionally, in an implementation scenario of this embodiment, information carried in a first information field in the at least one information field may include the redundancy version information corresponding to the information received and/or sent in the at least one transmission time period; and correspondingly, a processing procedure for step 702 may be as follows: The user terminal determines a status of at least one bit of the first information field; the user terminal determines M, where the at least one transmission time period is M transmission time periods, and M is a positive integer greater than or equal to 1; and the user terminal determines, based on a quantity of bits of the first information field, the status of the at least one bit of the first information field, and M, the redundancy version information corresponding to the information received and/or sent in the M transmission time periods.

Optionally, the user terminal determines the quantity of bits of the first information field. Specifically, the quantity of bits of the first information field may be fixed or predefined, or the quantity of bits is determined by performing steps 601 to 603 or in another manner. This is not limited in this embodiment. The quantity of bits of the first information field is a quantity of bits of the information included in the first information field or a quantity of bits included in the first information field.

M indicates that the user terminal is to receive information in the M transmission time periods and/or is used to trigger the user terminal to send information in the M transmission time periods.

In an implementation, the user terminal may receive the first control information, and determine the at least one information field, a quantity of transmission time periods for receiving information by the user terminal, and/or a quantity (M) of transmission time periods for sending information by the user terminal, the quantity of bits of the first information field, and the status of the at least one bit. M may be determined by the user terminal based on the first control information or other control information, or may be determined based on higher layer signaling sent by the network device to the user terminal, or may be allocated by the network device to the user terminal based on a traffic volume of the user terminal.

The user terminal may prestore a correspondence between a quantity of transmission time periods, the quantity of bits of the first information field, the status of the bit of the first information field, and the redundancy version information corresponding to the information received and/or sent in the at least one transmission time period. The user terminal may determine, based on the correspondence, M, the quantity of bits of the first information field, and the status of the at least bit, the redundancy version information corresponding to the information received and/or sent in the M transmission time periods. The M transmission time periods may be continuous or discontinuous. This is not limited in this embodiment.

The correspondence may be specifically as follows: When the quantity of bits of the first information field is X, where a value of X may be configured based on higher layer signaling, fixed, or predefined, the user terminal may determine, based on a relationship between values of X and M, a quantity of bits indicating a redundancy version, and further determine the status of the at least one bit of the first information field based on a redundancy version corresponding to the information received and/or sent in the M transmission time periods. Three cases are included as follows:

(1) When M is greater than X, one bit in X is used to indicate information about the redundancy version, and one state of the at least one bit is corresponding to one redundancy version in at least two transmission time periods. A state 0 of the bit is corresponding to a redundancy version 0, and a state 1 of the bit is corresponding to a redundancy version 2, or vice versa. Herein a status of the bit and a value of the redundancy version are not specifically limited.

For example, if M is equal to 5 and X is equal to 4, at least one bit in X indicates that same redundancy version information is used in two transmission time periods, where the redundancy version information is (0, 2). M means that five transmission time periods are scheduled, including {a first transmission time period, . . . , a fifth transmission time period}. The first information field includes four bits, {a, b, c, d}. For example, the bit a may be corresponding to redundancy versions in the first transmission time period and the second transmission time period, the bit b may be corresponding to a redundancy version in the third transmission time period, the bit c may be corresponding to a redundancy version in the fourth transmission time period, and the bit d may be corresponding to a redundancy version in the fifth transmission time period; or the bit a may be corresponding to a redundancy version in the first transmission time period, the bit b may be corresponding to a redundancy version in the second transmission time period, the bit c may be corresponding to a redundancy version in the third transmission time period, and the bit d may be corresponding to redundancy versions in the fourth transmission time period and the fifth transmission time period.

For example, if M is equal to 6 and X is equal to 4, one bit in X indicates that same redundancy version information is used in two or three transmission time periods, where the redundancy version information is (0, 2). Specifically, two or three transmission time periods may be predefined. M means that six transmission time periods are scheduled, including {a first transmission time period, . . . , a sixth transmission time period}. The first information field includes four bits, {a, b, c, d}. For example, the bit a may be corresponding to a redundancy version in the first transmission time period, the bit b may be corresponding to a redundancy version in the second transmission time period, the bit c may be corresponding to a redundancy version in the third transmission time period, and the bit d may be corresponding to redundancy versions in the fourth transmission time period, the fifth transmission time period, and the sixth transmission time period; or the bit a may be corresponding to a redundancy version in the first transmission time period, the bit b may be corresponding to a redundancy version in the second transmission time period, the bit c may be corresponding to redundancy versions in the third transmission time period and the fourth transmission time period, and the bit d may be corresponding to redundancy versions in the fifth transmission time period and the sixth transmission time period.

(2) When M is less than X and M is greater than a first preset threshold, one state of each bit in X is corresponding to a redundancy version in a maximum of one TTI. The first preset threshold is a positive integer, and may be obtained by rounding down X/2 or X/3. This is not limited in this embodiment.

For example, if M is equal to 3, X is equal to 4, and the first preset threshold is 2, one state of at least one bit may be corresponding to redundancy version information in one transmission time period, where the redundancy version information is (0, 2). For example, M means that three transmission time periods are scheduled, including {a first transmission time period, . . . , a third transmission time period}. The first information field includes four bits, {a, b, c, d}. For example, the bit a may be corresponding to a redundancy version in the first transmission time period, the bit b may be corresponding to a redundancy version in the second transmission time period, and the bit c may be corresponding to a redundancy version in the third transmission time period; or the bit b may be corresponding to a redundancy version in the first transmission time period, the bit c may be corresponding to a redundancy version in the second transmission time period, the bit d may be corresponding to a redundancy version in the third transmission time period.

(3) When M is less than or equal to a first preset threshold, one state of every i bits is corresponding to a redundancy version in a maximum of one TTI. The first preset threshold is a positive integer, and may be obtained by rounding down X/i, where i is a positive integer greater than or equal to 1.

For example, if M is equal to 2, X is equal to 4, and i is equal to 2 or the first preset threshold is 2, one state of at least two bits is corresponding to a redundancy version in one TTI, and the redundancy version is (0, 1, 2, 3). For example, M means that two transmission time periods are scheduled, including {a first transmission time period, a second transmission time period}. The first information field includes four bits, {a, b, c, d}. For example, the bit a and the bit b may be corresponding to a redundancy version in the first transmission time period, and the bit c and the bit d may be corresponding to a redundancy version in the second transmission time period; or the bit a and the bit b may be corresponding to a redundancy version in the second transmission time period, and the bit c and the bit d may be corresponding to a redundancy version in the first transmission time period.

It should be noted that, in this solution, M may be the same as N, or may be different from N.

Beneficial effects of this solution are as follows: In the prior art, each TTI is corresponding to a redundancy version in one or two bits. If N sTTIs are scheduled, each piece of control information includes redundancy version information in N bits to 2N bits. However, based on this solution, a fixed bit may be used to indicate a redundancy version. This further reduces the quantity of bits of the information in the information field, that is, reduces resources occupied by the control information, and improves resource utilization, while ensuring that actions of the user terminal and the base station are consistent and that the control information can be received correctly.

Optionally, in another implementation scenario of this embodiment, information carried in a second information field in the at least one information field includes N; and correspondingly, a processing procedure for step 702 may be as follows: The user terminal determines a status of at least one bit of the second information field; and the user terminal determines N based on a first correspondence and the status of the at least one bit of the second information field, where the first correspondence is a correspondence between the status of the at least one bit and N, and the first correspondence is determined by the user terminal based on received higher layer signaling or predefined.

N indicates N transmission time periods, the first control information is used to instruct the user terminal to receive information in the N transmission time periods and/or used to trigger the user terminal to send information in the N transmission time periods, and N is a positive integer greater than or equal to 1.

In an implementation, the user terminal receives the first control information, determines the second information field, and obtains the status of the at least one bit of the second information field. A quantity of bits of the second information field may be fixed or predefined, or may be determined by the user equipment based on duration of a transmission time period, or may be determined by the user equipment based on higher layer signaling.

Case 1: The quantity of bits of the second information field is fixed or may be predefined.

The case 1 may be applicable to scheduling of a plurality of transmission time periods that are shorter than or equal to 0.5 ms, or may be applicable to scheduling of a plurality of transmission time periods of 1 ms. Correspondingly, a quantity of elements in a quantity set of transmission time periods that may be indicated by the second information field is determined by the quantity of bits of the second information field. For example, if the quantity of bits is n, a maximum quantity of elements in the quantity set is $2^n$. A value represented by each element in the quantity set may be configured by the user terminal based on higher layer signaling or predefined.

For example, if the quantity of bits of the second information field is 2, the quantity set of the transmission time periods indicated by the second information field may be defined as (1, alt 1, alt 2, alt 3), where alt 1 to alt 3 are corresponding to quantities of scheduled sTTIs, alt 1 to alt 3 are configured by the user terminal based on higher layer signaling, and the higher layer signaling may be RRC configuration information. alt 1 to alt 3 may alternatively be predefined values. The following uses an example in which the quantity of bits of the second information field is 2. The correspondence in this specification is not limited. To be specific, in another correspondence, 00 may alternatively be corresponding to alt 3 or corresponding to a quantity 3.

TABLE 4

| State of bits of the second information field | Quantity of transmission time periods |
| --- | --- |
| 00 | 1 |
| 01 | alt 1 |

TABLE 4-continued

| State of bits of the second information field | Quantity of transmission time periods |
| --- | --- |
| 11 | alt 2 |
| 10 | alt 3 |

TABLE 5

| State of bits of the second information field | Quantity of transmission time periods |
| --- | --- |
| 00 | 1 |
| 01 | 2 |
| 11 | 3 |
| 10 | 6 |

The user terminal may prestore the quantity of bits of the second information field, and further determine N based on the status of the at least one bit of the second information field and the foregoing policy.

Case 2: The quantity of bits of the second information field is variable.

The case 2 may be applicable to scheduling of a plurality of transmission time periods that are shorter than or equal to 0.5 ms. The user terminal may determine the quantity of bits of the second information field based on duration of a scheduled transmission time period, and then determine the status of the at least one bit of the second information field based on N and the first correspondence.

For example, if the duration of the transmission time period is seven symbols, the quantity of bits of the second information field is 1; if the duration of the transmission time period is four symbols, the quantity of bits of the second information field is 2; or if the duration of the transmission time period is two symbols, the quantity of bits of the second information field is 3. The following uses an example in which the duration of the transmission time period is two symbols, and the quantity of bits of the second information field is 3. The correspondence in this specification is not limited. To be specific, in another correspondence, 000 may alternatively be corresponding to 4.

TABLE 6

| State of bits of the second information field | Quantity of transmission time periods |
| --- | --- |
| 000 | 1 |
| 001 | 2 |
| 011 | 3 |
| 010 | 4 |
| 100 | 5 |
| 101 | 6 |
| 111 | Reserved |
| 110 | Reserved |

The user terminal may obtain the quantity of bits of the second information field based on a configuration of higher layer signaling or a predefinition or duration of a transmission time period, and then determine N based on the status of the at least one bit of the second information field and the foregoing policy.

It should be noted that, content of the first correspondence in the case 1 may be different from content of the first correspondence in the case 2.

Beneficial effects of this solution are as follows: In the prior art, control information includes a fixed quantity of bits that may satisfy a maximum quantity of scheduled TTIs, for example, three bits. In this solution, a quantity of bits of information in the information field can be reduced, and a quantity of bits indicating a maximum quantity of scheduled TTIs does not need to be included. This further reduces the quantity of bits of the information in the information field, that is, reduces resources occupied by the control information, and improves resource utilization, while ensuring that actions of the user terminal and the base station are consistent and that the control information can be received correctly.

Optionally, in another implementation scenario of this embodiment, information carried in a third information field in the at least one information field includes the information indicating whether the uplink data is to be transmitted on the uplink channel in the at least one transmission time period; and correspondingly, a processing procedure for step 702 may be as follows: The user terminal determines P, where P indicates that the user terminal is to receive information in P transmission time periods and/or indicates that the user terminal is to send information in the P transmission time periods, and P is a positive integer greater than or equal to 1.

The user terminal compares P with 1.

In an implementation, when P is greater than 1, the user terminal may determine that the third information field is an information field of K bits, and that the information carried in the third information field indicates whether the uplink data is to be transmitted on the uplink channel in K transmission time periods in the P transmission time periods, where K is a positive integer greater than or equal to 1 and less than or equal to P. To be specific, the third information field may be used to indicate that the uplink data is to be transmitted on the uplink channel in a part of the K transmission time periods, and that no uplink data is to be transmitted on the uplink channel in other parts of the K transmission time periods. For example, when a quantity of scheduled transmission time periods is greater than 1, a status of one of K bits may be used to indicate that the uplink data is to be transmitted on the uplink channel in a transmission time period corresponding to the one bit, or that no uplink data is to be transmitted on the uplink channel in a transmission time period corresponding to the one bit. For another example, when a quantity of scheduled transmission time periods is greater than 1, data of one bit may be used to indicate that the uplink data is to be transmitted in a predefined sTTI, or data of one bit may be used to indicate that no uplink data is to be transmitted in a predefined sTTI.

When P is equal to 1, the user terminal determines that the third information field is a modulation and coding scheme MCS information field, and that the information carried in the third information field indicates whether the uplink data is to be transmitted on the uplink channel in the P transmission time periods, where a state 29 of a bit in the MCS information field may be used to indicate that no uplink data is to be transmitted on the uplink channel in the transmission time period.

It should be noted that, in this solution, P may be the same as N, or may be different from N. P and K may be determined by the network device based on the first control information or other control information, or may be determined based on higher layer signaling sent by the network device to the user terminal, or may be allocated by the network device to the user terminal based on a traffic volume of the user terminal, or may be determined by the network device by itself. Details are not described herein again.

After determining the third information field, the user terminal obtains the information carried in the third information field, and determines whether the uplink data is to be transmitted on the uplink channel in the K transmission time periods, or determines whether the uplink data is to be transmitted on the uplink channel in one transmission time period.

Beneficial effects of this solution are as follows: In the prior art, when a plurality of TTIs are scheduled, to reduce overheads, control information includes only one MCS information field, that is, information in the plurality of TTIs is transmitted by using a same MCS. If the state 29 of the bit in the MCS information field is still used to indicate indication information about whether uplink data is to be transmitted in a TTI, it can only indicate that the uplink data is to be transmitted in all TTIs or that the uplink data is not to be transmitted in any TTI. However, actually, only one TTI is not used for transmitting the uplink data, and consequently resources are wasted. In this solution, the indication information may be sent in one control message to indicate whether the uplink data is to be transmitted in a TTI. This further reduces the quantity of bits of the information in the information field, that is, reduces resources occupied by the control information, and improves resource utilization, while ensuring that actions of the user terminal and the base station are consistent and that the control information can be received correctly.

Figure 8:
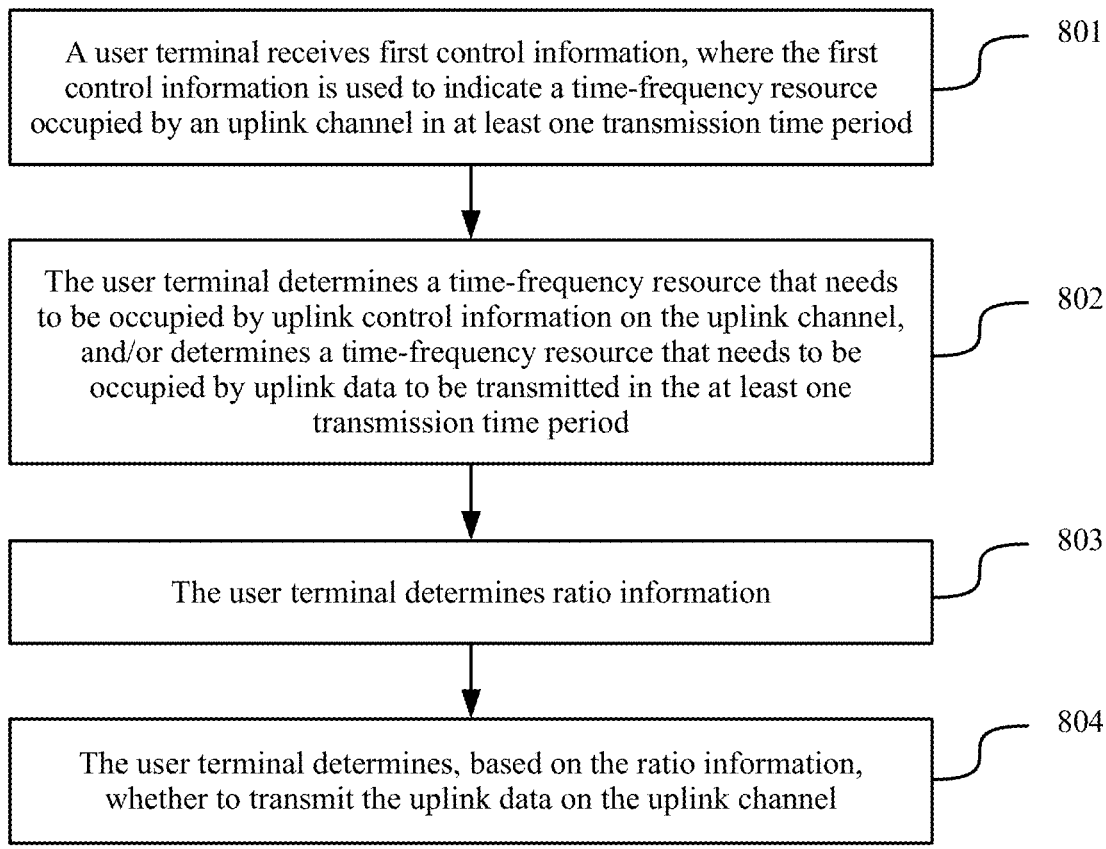
FIG. 8 is a flowchart of a method for detecting control information according to an embodiment of the present application.

In addition, an embodiment further provides a method for detecting control information. The method may be performed by a user terminal. As shown in FIG. 8, a processing procedure for the method may be as follows:

Step 801: The user terminal receives first control information, where the first control information is used to indicate a time-frequency resource occupied by an uplink channel in at least one transmission time period.

One or more of the at least one transmission time period are duration shorter than or equal to 0.5 ms.

Step 802: The user terminal determines a time-frequency resource that needs to be occupied by uplink control information on the uplink channel, and/or determines a time-frequency resource that needs to be occupied by uplink data to be transmitted in the at least one transmission time period.

In an implementation, the time-frequency resource that needs to be occupied by the uplink control information may be a quantity of bits of the uplink control information, or duration corresponding to the uplink control information. The time-frequency resource that needs to be occupied by the uplink data to be transmitted in the at least one transmission time period may be a quantity of bits of the uplink data, or duration corresponding to the uplink data. The time-frequency resource that needs to be occupied by the uplink control information may alternatively be determined based on the quantity of bits of the uplink control information and a modulation and coding scheme of the uplink control information. The time-frequency resource that needs to be occupied by the uplink data may alternatively be determined based on the quantity of bits of the uplink data and a modulation and coding scheme of the uplink data.

Step 803: The user terminal determines ratio information, where the ratio information is a ratio of the time-frequency resource that needs to be occupied by the uplink control information on the uplink channel to the time-frequency resource occupied by the uplink channel, or a ratio of the time-frequency resource that needs to be occupied by the uplink data to be transmitted in the at least one transmission time period to the time-frequency resource occupied by the uplink channel, or a ratio of the time-frequency resource that needs to be occupied by the uplink control information on the uplink channel to the time-frequency resource that needs to be occupied by the uplink data to be transmitted in the at least one transmission time period.

Step 804: The user terminal determines, based on the ratio information, whether to transmit the uplink data on the uplink channel.

In an implementation, the user terminal may compare the ratio information with a second preset threshold; and when the ratio is the ratio of the time-frequency resource that needs to be occupied by the uplink control information on the uplink channel to the time-frequency resource occupied by the uplink channel, or the ratio of the time-frequency resource that needs to be occupied by the uplink control information on the uplink channel to the time-frequency resource that needs to be occupied by the uplink data to be transmitted in the at least one transmission time period, if the ratio information is greater than the second preset threshold, it may be determined that no uplink data is to be transmitted on the uplink channel; or if the ratio information is less than or equal to the second preset threshold, it may be determined that the uplink data is to be transmitted on the uplink channel. When the ratio is the ratio of the time-frequency resource that needs to be occupied by the uplink data to be transmitted in the at least one transmission time period to the time-frequency resource occupied by the uplink channel, if the ratio information is less than the second preset threshold, it may be determined that no uplink data is to be transmitted on the uplink channel; or if the ratio information is greater than or equal to the second preset threshold, it may be determined that the uplink data is to be transmitted on the uplink channel. The second preset threshold may be notified by a network device by using signaling or predefined.

Beneficial effects of this solution are as follows: In the prior art, when TTIs are scheduled, control information of each TTI includes indication information about whether uplink data is transmitted. However, in this solution, the indication information does not need to be sent. This can reduce time-frequency domain resources occupied by the control information, further reduce the quantity of bits of the information in the information field, that is, reduce resources occupied by the control information, and improve resource utilization, while ensuring that actions of the user terminal and the base station are consistent and that the control information can be received correctly.

Based on a same technical concept, an embodiment of the present application further provides a network device. As shown in FIG. 2, the network device includes a processor 210, a transceiver 220, and a memory 230, where both the transceiver 220 and the memory 230 are connected to the processor 210, where the processor 210 is configured to determine, based on a first time-frequency domain resource for sending first control information, at least one information field included in the first control information;

the processor 210 is further configured to determine a quantity of bits of the first control information based on the at least one information field; and the transceiver 220 is configured to send the first control information to a user terminal on the first time-frequency domain resource based on the quantity of bits of the first control information.

Optionally, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

Optionally, when the first time-frequency domain resource is a time-frequency domain resource beyond a first time region, the at least one information field includes a second information field, information carried in the second information field is used to indicate a time-frequency domain resource not occupied by a downlink control channel or used to indicate a time-frequency domain resource occupied by a downlink data channel, and the first time region is a time region to which first one, two, three, or four symbols in a downlink subframe belong, or is a physical downlink control channel PDCCH region.

Optionally, when the first time-frequency domain resource is a time-frequency domain resource in a second time region, the at least one information field includes a third information field, information carried in the third information field is used to trigger the user terminal to send a sounding reference signal SRS, and the second time region is predefined or configured.

Optionally, when the first time-frequency domain resource is a time-frequency domain resource in a third time region, the at least one information field includes a fourth information field, information carried in the fourth information field is used to trigger the user terminal to send channel quality information CSI, and the third time region is predefined or configured.

Optionally, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

Based on a same technical concept, an embodiment of the present application further provides a network device. As shown in FIG. 2, the network device includes a processor 210, a transceiver 220, and a memory 230, where both the transceiver 220 and the memory 230 are connected to the processor 210, where the processor 210 is configured to determine at least one information field included in first control information, where information carried in the at least one information field includes at least one or any combination of the following:

redundancy version information corresponding to information received and/or sent in at least one transmission time period;

N, where N indicates N transmission time periods, the first control information is used to instruct a user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and the transceiver 220 is configured to send the first control information to the user terminal.

Optionally, the at least one information field includes a first information field, and information carried in the first information field includes the redundancy version information corresponding to the information received and/or sent in the at least one transmission time period; and the processor 210 is further configured to:

determine M, where the at least one transmission time period is M transmission time periods, and M is a positive integer greater than or equal to 1; and determine a status of at least one bit of the first information field based on M, a quantity of bits of the first information field, and the redundancy version information corresponding to the information received and/or sent in the M transmission time periods.

Optionally, the at least one information field includes a second information field, and information carried in the second information field includes N; and the processor 210 is further configured to:

determine a status of at least one bit of the second information field based on N and a first correspondence, where the first correspondence is a correspondence between the status of the at least one bit and N, and the first correspondence is configured by the network device or predefined.

Optionally, the at least one information field includes a third information field, and information carried in the third information field includes the information indicating whether the uplink data is to be transmitted on the uplink channel in the at least one transmission time period; and the processor 210 is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the third information field is used to indicate whether the uplink data is to be transmitted on the uplink channel in K transmission time periods in the P transmission time periods, where K is a positive integer greater than or equal to 1 and less than or equal to P; and/or when P is equal to 1, determine that the third information field is a modulation and coding scheme MCS information field, and that the third information field is used to indicate whether the uplink data is to be transmitted on the uplink channel in one transmission time period.

Optionally, one or more of the at least one transmission time period are duration shorter than or equal to 0.5 ms.

Based on a same technical concept, an embodiment of the present application further provides a user terminal. As shown in FIG. 2, the user terminal includes a processor 210, a transceiver 220, and a memory 230, where both the transceiver 220 and the memory 230 are connected to the processor 210, where the processor 210 is configured to determine, based on a first time-frequency domain resource for detecting first control information, at least one information field included in the first control information;

the processor 210 is further configured to determine a quantity of bits of the first control information based on the at least one information field;

the processor 210 is further configured to detect the first control information on the first time-frequency domain resource based on the quantity of bits of the first control information; and the transceiver 220 is configured to receive the first control information after the processor 210 detects the first control information.

Optionally, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

Optionally, when the first time-frequency domain resource is a time-frequency domain resource beyond a first time region, the at least one information field includes a second information field, information carried in the second information field is used to indicate a time-frequency domain resource not occupied by a downlink control channel or used to indicate a time-frequency domain resource occupied by a downlink data channel, and the first time region is a time region to which first one, two, three, or four symbols in a downlink subframe belong, or is a physical downlink control channel PDCCH region.

Optionally, when the first time-frequency domain resource is a time-frequency domain resource in a second time region, the at least one information field includes a third information field, information carried in the third information field is used to trigger the user terminal to send a sounding reference signal SRS, and the second time region is determined by the user terminal based on received higher layer signaling or predefined.

Optionally, when the first time-frequency domain resource is a time-frequency domain resource in a third time region, the at least one information field includes a fourth information field, information carried in the fourth information field is used to trigger the user terminal to send channel quality information CSI, and the third time region is determined by the user terminal based on received higher layer signaling or predefined.

Optionally, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

Based on a same technical concept, an embodiment of the present application further provides a user terminal. As shown in FIG. 2, the user terminal includes a processor 210, a transceiver 220, and a memory 230, where both the transceiver 220 and the memory 230 are connected to the processor 210, where the processor 210 is configured to receive first control information, where the first control information includes at least one information field, and information carried in the at least one information field includes at least one or any combination of the following:

redundancy version information corresponding to information received and/or sent in at least one transmission time period;

N, where N indicates N transmission time periods, the first control information is used to instruct the user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and the processor 210 is further configured to obtain the information carried in the at least one information field.

Optionally, information carried in a first information field in the at least one information field includes the redundancy version information corresponding to the information received and/or sent in the at least one transmission time period; and the processor 210 is further configured to:

determine a status of at least one bit of the first information field;

determine M, where the at least one transmission time period is M transmission time periods, and M is a positive integer greater than or equal to 1; and determine, based on a quantity of bits of the first information field, the status of the at least one bit of the first information field, and M, the redundancy version information corresponding to the information received and/or sent in the M transmission time periods.

Optionally, information carried in a second information field in the at least one information field includes N; and the processor 210 is further configured to:

determine a status of at least one bit of the second information field; and determine N based on a first correspondence and the status of the at least one bit of the second information field, where the first correspondence is a correspondence between the status of the at least one bit and N, and the first correspondence is determined by the user terminal based on received higher layer signaling or predefined.

Optionally, information carried in a third information field in the at least one information field includes the information indicating whether the uplink data is to be transmitted on the uplink channel in the at least one transmission time period; and the processor 210 is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the information carried in the third information field indicates whether the uplink data is to be transmitted on the uplink channel in K transmission time periods in the P transmission time periods; and/or when P is equal to 1, determine that the third information field is a modulation and coding scheme MCS information field, and that the information carried in the third information field indicates whether the uplink data is to be transmitted on the uplink channel in the P transmission time periods.

Optionally, one or more of the at least one transmission time period are duration shorter than or equal to 0.5 ms.

Based on a same technical concept, an embodiment of the present application further provides a user terminal. As shown in FIG. 2, the user terminal includes a processor 210, a transceiver 220, and a memory 230, where both the transceiver 220 and the memory 230 are connected to the processor 210, where the transceiver 220 is configured to receive first control information, where the first control information is used to indicate a time-frequency resource occupied by an uplink channel in at least one transmission time period;

the processor 210 is configured to determine a time-frequency resource that needs to be occupied by uplink control information on the uplink channel, and/or determine a time-frequency resource that needs to be occupied by uplink data to be transmitted in the at least one transmission time period;

the processor 210 is further configured to determine ratio information, where the ratio information is a ratio of the time-frequency resource that needs to be occupied by the uplink control information on the uplink channel to the time-frequency resource occupied by the uplink channel, or a ratio of the time-frequency resource that needs to be occupied by the uplink data to be transmitted in the at least one transmission time period to the time-frequency resource occupied by the uplink channel, or a ratio of the time-frequency resource that needs to be occupied by the uplink control information on the uplink channel to the time-frequency resource that needs to be occupied by the uplink data to be transmitted in the at least one transmission time period; and the processor 210 is further configured to determine, based on the ratio information, whether to transmit the uplink data on the uplink channel.

Figure 9:
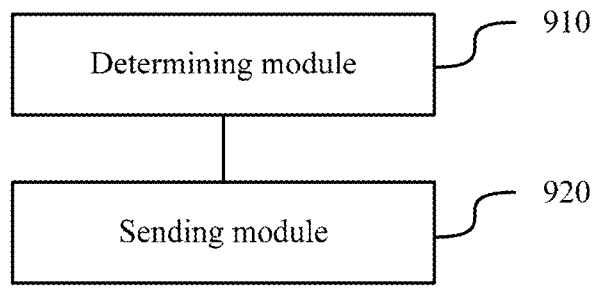
FIG. 9 is a schematic structural diagram of a network device according to an embodiment of the present application.

Based on a same technical concept, an embodiment of the present application further provides a network device. As shown in FIG. 9, the network device includes:

a determining module 910, configured to determine, based on a first time-frequency domain resource for sending first control information, at least one information field included in the first control information; where the determining module 910 is further configured to determine a quantity of bits of the first control information based on the at least one information field; and a sending module 920, configured to send the first control information to a user terminal on the first time-frequency domain resource based on the quantity of bits of the first control information.

The determining module 910 may be implemented by a processor, and the sending module 920 may be implemented by a transceiver. In addition, the determining module 910 may be specifically a processing module, and the sending module 920 may be specifically a transceiver module.

Optionally, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

Optionally, when the first time-frequency domain resource is a time-frequency domain resource beyond a first time region, the at least one information field includes a second information field, information carried in the second information field is used to indicate a time-frequency domain resource not occupied by a downlink control channel or used to indicate a time-frequency domain resource occupied by a downlink data channel, and the first time region is a time region to which first one, two, three, or four symbols in a downlink subframe belong, or is a physical downlink control channel PDCCH region.

Optionally, when the first time-frequency domain resource is a time-frequency domain resource in a second time region, the at least one information field includes a third information field, information carried in the third information field is used to trigger the user terminal to send a sounding reference signal SRS, and the second time region is predefined or configured.

Optionally, when the first time-frequency domain resource is a time-frequency domain resource in a third time region, the at least one information field includes a fourth information field, information carried in the fourth information field is used to trigger the user terminal to send channel quality information CSI, and the third time region is predefined or configured.

Optionally, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

Based on a same technical concept, an embodiment of the present application further provides a network device. As shown in FIG. 9, the network device includes:

a determining module 910, configured to determine at least one information field included in first control information, where information carried in the at least one information field includes at least one or any combination of the following:

redundancy version information corresponding to information received and/or sent in at least one transmission time period;

N, where N indicates N transmission time periods, the first control information is used to instruct a user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and a sending module 920, configured to send the first control information to the user terminal.

The determining module 910 may be implemented by a processor, and the sending module 920 may be implemented by a transceiver. In addition, the determining module 910 may be specifically a processing module, and the sending module 920 may be specifically a transceiver module.

Optionally, the at least one information field includes a first information field, and information carried in the first information field includes the redundancy version information corresponding to the information received and/or sent in the at least one transmission time period; and the determining module 910 is further configured to:
determine M, where the at least one transmission time period is M transmission time periods, and M is a positive integer greater than or equal to 1; and
determine a status of at least one bit of the first information field based on M, a quantity of bits of the first information field, and the redundancy version information corresponding to the information received and/or sent in the M transmission time periods.

Optionally, the at least one information field includes a second information field, and information carried in the second information field includes N; and
the determining module 910 is further configured to:
determine a status of at least one bit of the second information field based on N and a first correspondence, where the first correspondence is a correspondence between the status of the at least one bit and N, and the first correspondence is configured by the network device or predefined.

Optionally, the at least one information field includes a third information field, and information carried in the third information field includes the information indicating whether the uplink data is to be transmitted on the uplink channel in the at least one transmission time period; and
the determining module 910 is further configured to:
determine P, where P indicates that the user terminal is to receive information in P transmission time periods and/or indicates that the user terminal is to send information in the P transmission time periods, and P is a positive integer greater than or equal to 1;
when P is greater than 1, determine that the third information field is an information field of K bits, and that the third information field is used to indicate whether the uplink data is to be transmitted on the uplink channel in K transmission time periods in the P transmission time periods, where K is a positive integer greater than or equal to 1 and less than or equal to P; and/or
when P is equal to 1, determine that the third information field is a modulation and coding scheme MCS information field, and that the third information field is used to indicate whether the uplink data is to be transmitted on the uplink channel in one transmission time period.

Optionally, one or more of the at least one transmission time period are duration shorter than or equal to 0.5 ms.

Figure 10:
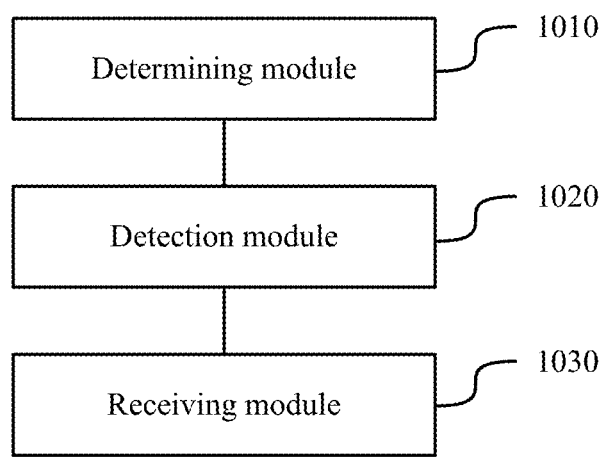
FIG. 10 is a schematic structural diagram of a user terminal according to an embodiment of the present application.

Based on a same technical concept, an embodiment of the present application further provides a user terminal. As shown in FIG. 10, the user terminal includes:

a determining module 1010, configured to determine, based on a first time-frequency domain resource for detecting first control information, at least one information field included in the first control information; where
the determining module 1010 is further configured to determine a quantity of bits of the first control information based on the at least one information field;

a detection module 1020, configured to detect the first control information on the first time-frequency domain resource based on the quantity of bits of the first control information; and a receiving module 1030, configured to receive the first control information after the detection module detects the first control information.

The determining module 1010 and the detection module 1020 may be implemented by a processor, and the receiving module 1030 may be implemented by a transceiver. In addition, the determining module 1010 and the detection module 1020 may be specifically a processing module, and the receiving module 1030 may be specifically a transceiver module.

Optionally, when the first time-frequency domain resource is a time-frequency domain resource in a first time region, the at least one information field includes a first information field, information carried in the first information field is used to indicate one of at least two control information formats or used to indicate one of at least two time lengths, and the first time region is a time region to which first one, two, three, or four symbols in a downlink subframe belong, or is a physical downlink control channel PDCCH region.

Optionally, when the first time-frequency domain resource is a time-frequency domain resource beyond a first time region, the at least one information field includes a second information field, information carried in the second information field is used to indicate a time-frequency domain resource not occupied by a downlink control channel or used to indicate a time-frequency domain resource occupied by a downlink data channel, and the first time region is a time region to which first one, two, three, or four symbols in a downlink subframe belong, or is a physical downlink control channel PDCCH region.

Optionally, when the first time-frequency domain resource is a time-frequency domain resource in a second time region, the at least one information field includes a third information field, information carried in the third information field is used to trigger the user terminal to send a sounding reference signal SRS, and the second time region is determined by the user terminal based on received higher layer signaling or predefined.

Optionally, when the first time-frequency domain resource is a time-frequency domain resource in a third time region, the at least one information field includes a fourth information field, information carried in the fourth information field is used to trigger the user terminal to send channel quality information CSI, and the third time region is determined by the user terminal based on received higher layer signaling or predefined.

Optionally, the first time-frequency domain resource includes at least one of the following three items: a time-frequency domain resource in the PDCCH region, a time-frequency domain resource in the time region to which the first one, two, three, or four symbols in the downlink subframe belong, and a time-frequency domain resource in a transmission time period that is shorter than or equal to 0.5 ms.

Figure 11:
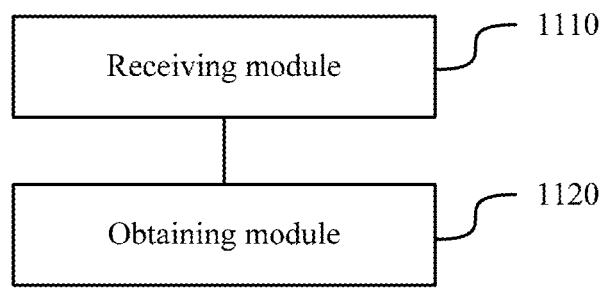
FIG. 11 is a schematic structural diagram of a user terminal according to an embodiment of the present application.

Based on a same technical concept, an embodiment of the present application further provides a user terminal. As shown in FIG. 11, the user terminal includes:

a receiving module 1110, configured to receive first control information, where the first control information includes at least one information field, and information carried in the at least one information field includes at least one or any combination of the following:

redundancy version information corresponding to information received and/or sent in at least one transmission time period;

N, where N indicates N transmission time periods, the first control information is used to instruct the user terminal to receive information in the N transmission time periods and/or used to trigger the user terminal to send information in the N transmission time periods, and N is a positive integer greater than or equal to 1; and information indicating whether uplink data is to be transmitted on an uplink channel in at least one transmission time period; and an obtaining module 1120, configured to obtain the information carried in the at least one information field.

The obtaining module 1120 may be implemented by a processor, and the receiving module 1110 may be implemented by a transceiver. In addition, the receiving module 1110 may be specifically a transceiver module, and the obtaining module 1120 may be specifically a processing module.

Optionally, information carried in a first information field in the at least one information field includes the redundancy version information corresponding to the information received and/or sent in the at least one transmission time period; and the obtaining module 1120 is further configured to:

determine a status of at least one bit of the first information field;

determine M, where the at least one transmission time period is M transmission time periods, and M is a positive integer greater than or equal to 1; and determine, based on a quantity of bits of the first information field, the status of the at least one bit of the first information field, and M, the redundancy version information corresponding to the information received and/or sent in the M transmission time periods.

Optionally, information carried in a second information field in the at least one information field includes N; and the obtaining module 1120 is further configured to:

determine a status of at least one bit of the second information field; and determine N based on a first correspondence and the status of the at least one bit of the second information field, where the first correspondence is a correspondence between the status of the at least one bit and N, and the first correspondence is determined by the user terminal based on received higher layer signaling or predefined.

Optionally, information carried in a third information field in the at least one information field includes the information indicating whether the uplink data is to be transmitted on the uplink channel in the at least one transmission time period; and the obtaining module 1120 is further configured to:

determine P, where P indicates that the user terminal is to receive information in P transmission time periods and/or indicates that the user terminal is to send information in the P transmission time periods, and P is a positive integer greater than or equal to 1;

when P is greater than 1, determine that the third information field is an information field of K bits, and that the information carried in the third information field indicates whether the uplink data is to be transmitted on the uplink channel in K transmission time periods in the P transmission time periods; and/or when P is equal to 1, determine that the third information field is a modulation and coding scheme MCS information field, and that the information carried in the third information field indicates whether the uplink data is to be transmitted on the uplink channel in the P transmission time periods.

Optionally, one or more of the at least one transmission time period are duration shorter than or equal to 0.5 ms.

Figure 12:
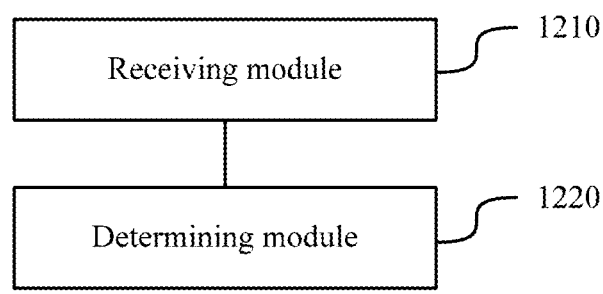
FIG. 12 is a schematic structural diagram of a user terminal according to an embodiment of the present application.

Based on a same technical concept, an embodiment of the present application further provides a user terminal. As shown in FIG. 12, the user terminal includes:

a receiving module 1210, configured to receive first control information, where the first control information is used to indicate a time-frequency resource occupied by an uplink channel in at least one transmission time period; and a determining module 1220, configured to determine a time-frequency resource that needs to be occupied by uplink control information on the uplink channel, and/or determine a time-frequency resource that needs to be occupied by uplink data to be transmitted in the at least one transmission time period; where the determining module 1220 is further configured to determine ratio information, where the ratio information is a ratio of the time-frequency resource that needs to be occupied by the uplink control information on the uplink channel to the time-frequency resource occupied by the uplink channel, or a ratio of the time-frequency resource that needs to be occupied by the uplink data to be transmitted in the at least one transmission time period to the time-frequency resource occupied by the uplink channel, or a ratio of the time-frequency resource that needs to be occupied by the uplink control information on the uplink channel to the time-frequency resource that needs to be occupied by the uplink data to be transmitted in the at least one transmission time period; and the determining module 1220 is further configured to determine, based on the ratio information, whether to transmit the uplink data on the uplink channel.

The determining module 1220 may be implemented by a processor, and the receiving module 1210 may be implemented by a transceiver. In addition, the determining module 1220 may be specifically a processing module, and the receiving module 1210 may be specifically a transceiver module.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A method for sending control information, the method comprising:
   determining, by a network device, at least one information field comprised in first control information based on a first time-frequency domain resource for sending the first control information;
   determining, by the network device, a quantity of bits of the first control information based on the at least one information field; and
   sending, by the network device, the first control information to a user terminal on the first time-frequency domain resource based on the quantity of bits of the first control information;
   wherein the first time-frequency domain resource is a time-frequency domain resource beyond a first time region;
   wherein the at least one information field comprises a second information field;
   wherein information carried in the second information field indicates:
      a time-frequency domain resource not occupied by a downlink control channel, or
      a time-frequency domain resource occupied by a downlink control channel, or
      a time-frequency domain resource occupied by a downlink data channel; and
   wherein the first time region is a time region to which first two symbols in a downlink subframe belong, or is a time region to which first three symbols in a downlink subframe belong, or is a physical downlink control channel (PDCCH) region.

2. The method according to claim 1, wherein the information carried in the second information field indicates the time-frequency domain resource occupied by the downlink control channel, and the information carried in the second information field comprises:
   control channel elements (CCEs) occupied by the downlink control channel which carries downlink control information (DCI) in a transmission time period, wherein the transmission time period is shorter than or equal to 0.5 ms (milliseconds).

3. The method according to claim 1, wherein the first time-frequency domain resource is a time-frequency domain resource in a transmission time period that is shorter than or equal to 0.5 ms (milliseconds).

4. A method for detecting control information, the method comprising:
   determining, by a user terminal, at least one information field comprised in first control information based on a first time-frequency domain resource for detecting the first control information;
   determining, by the user terminal, a quantity of bits of the first control information based on the at least one information field;
   detecting, by the user terminal, the first control information on the first time-frequency domain resource based on the quantity of bits of the first control information; and
   receiving, by the user terminal, the first control information after detecting the first control information;
   wherein the first time-frequency domain resource is a time-frequency domain resource beyond a first time region;
   wherein the at least one information field comprises a second information field;
   wherein information carried in the second information field indicates:
      a time-frequency domain resource not occupied by a downlink control channel, or
      a time-frequency domain resource occupied by a downlink control channel, or
      a time-frequency domain resource occupied by a downlink data channel; and
   wherein the first time region is a time region to which first two symbols in a downlink subframe belong, or is a time region to which first three symbols in a downlink subframe belong, or is a physical downlink control channel (PDCCH) region.

5. The method according to claim 4, wherein the information carried in the second information field indicates the time-frequency domain resource occupied by the downlink control channel, and the information carried in the second information field comprises:
   control channel elements (CCEs) occupied by the downlink control channel which carries downlink control information (DCI) in a transmission time period, wherein the transmission time period is shorter than or equal to 0.5 ms (milliseconds).

6. The method according to claim 4, wherein the first time-frequency domain resource is a time-frequency domain resource in a transmission time period that is shorter than or equal to 0.5 ms (milliseconds).

7. A network device, comprising:
   a processor, configured to:
      determine, based on a first time-frequency domain resource for sending first control information, at least one information field comprised in the first control information; and
      determine a quantity of bits of the first control information based on the at least one information field; and
   a sending circuit, configured to send the first control information to a user terminal on the first time-frequency domain resource based on the quantity of bits of the first control information;
   wherein the first time-frequency domain resource is a time-frequency domain resource beyond a first time region;
   wherein the at least one information field comprises a second information field;
   wherein information carried in the second information field indicates:
      a time-frequency domain resource not occupied by a downlink control channel, or a time-frequency domain resource occupied by a downlink control channel; or a time-frequency domain resource occupied by a downlink data channel, and wherein the first time region is a time region to which first two symbols in a downlink subframe belong, or is a time region to which first three symbols in a downlink subframe belong, or is a physical downlink control channel (PDCCH) region.

8. The network device according to claim 7, wherein the information carried in the second information field indicates the time-frequency domain resource occupied by the downlink control channel, and the information carried in the second information field comprises:

control channel elements (CCEs) occupied by the downlink control channel which carries downlink control information (DCI) in a transmission time period, wherein the transmission time period is shorter than or equal to 0.5 ms (milliseconds).

9. The network device according to claim 7, wherein the first time-frequency domain resource is a time-frequency domain resource in a transmission time period that is shorter than or equal to 0.5 ms (milliseconds).

10. A user terminal, comprising:
a processor, configured to:
determine, based on a first time-frequency domain resource for detecting first control information, at least one information field comprised in the first control information; wherein
determine a quantity of bits of the first control information based on the at least one information field;
detect the first control information on the first time-frequency domain resource based on the quantity of bits of the first control information; and a receiving circuit, configured to receive the first control information after the processor detects the first control information;

wherein the first time-frequency domain resource is a time-frequency domain resource beyond a first time region;

wherein the at least one information field comprises a second information field;

wherein information carried in the second information field indicates:
a time-frequency domain resource not occupied by a downlink control channel, or
a time-frequency domain resource occupied by a downlink control channel, or
a time-frequency domain resource occupied by a downlink data channel; and wherein the first time region is a time region to which first two symbols in a downlink subframe belong, or is a time region to which first three symbols in a downlink subframe belong, or is a physical downlink control channel (PDCCH) region.

11. The user terminal according to claim 10, wherein the information carried in the second information field indicates the time-frequency domain resource occupied by the downlink control channel, and the information carried in the second information field comprises:

control channel elements (CCEs) occupied by the downlink control channel which carries downlink control information (DCI) in a transmission time period, wherein the transmission time period is shorter than or equal to 0.5 ms (milliseconds).

12. The user terminal according to claim 10, wherein the first time-frequency domain resource is a time-frequency domain resource in a transmission time period that is shorter than or equal to 0.5 ms (milliseconds).

* * * * *